US010905961B2

(12) United States Patent
Nakamura et al.

(10) Patent No.: US 10,905,961 B2
(45) Date of Patent: Feb. 2, 2021

(54) USER MANAGEMENT SERVER, TERMINAL, INFORMATION DISPLAY SYSTEM, USER MANAGEMENT METHOD, INFORMATION DISPLAY METHOD, PROGRAM, AND INFORMATION STORAGE MEDIUM

(71) Applicants: SONY CORPORATION, Tokyo (JP); SONY INTERACTIVE ENTERTAINMENT INC., Tokyo (JP)

(72) Inventors: Yuji Nakamura, Tokyo (JP); Fumiaki Hisamatsu, Tokyo (JP); Makoto Saito, Tokyo (JP); Soushi Urakawa, Tokyo (JP); Tatsuya Goto, Kanagawa (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/553,591

(22) PCT Filed: Feb. 19, 2016

(86) PCT No.: PCT/JP2016/054889
§ 371 (c)(1),
(2) Date: Aug. 25, 2017

(87) PCT Pub. No.: WO2016/136626
PCT Pub. Date: Sep. 1, 2016

(65) Prior Publication Data
US 2018/0043266 A1 Feb. 15, 2018

(30) Foreign Application Priority Data
Feb. 27, 2015 (JP) .................................. 2015-039037

(51) Int. Cl.
*A63F 9/24* (2006.01)
*A63F 13/795* (2014.01)
(Continued)

(52) U.S. Cl.
CPC ............ *A63F 13/795* (2014.09); *A63F 13/25* (2014.09); *A63F 13/35* (2014.09); *A63F 13/52* (2014.09); *A63F 13/79* (2014.09); *A63F 13/87* (2014.09)

(58) Field of Classification Search
CPC ................................ G06Q 50/01; H04L 51/32
See application file for complete search history.

(56) References Cited

U.S. PATENT DOCUMENTS

2010/0281520 A1* 11/2010 Deguchi ................. G06F 21/31
726/3
2012/0290950 A1* 11/2012 Rapaport ................ H04L 51/32
715/753

FOREIGN PATENT DOCUMENTS

JP 2009-163445 A 7/2009
JP 2013-000588 A 1/2013
(Continued)

OTHER PUBLICATIONS

The International Search Report of May 17, 2016 for PCT/JP2016/054889 and English translation thereof.
(Continued)

*Primary Examiner* — David L Lewis
*Assistant Examiner* — Eric M Thomas
(74) *Attorney, Agent, or Firm* — HEA Law PLLC

(57) ABSTRACT

A user management server, a terminal, an information display system, a user management method, an information display method, a program, and an information storage medium are provided to enable a user to have less trouble than with existing techniques in registering users disclosing their real names. In response to a first operation to designate a user, a friend management data registration part registers the user as a user in a first relation involving disclosure of a nickname. In response to a second operation to designate a user already registered as a user in the first relation, the
(Continued)

friend management data registration part registers the user as a user in a second relation involving disclosure of a real name as well. In response to a third operation to designate a user not registered as a user in the first relation, the friend management data registration part registers the user as a user in the first and the second relations.

6 Claims, 20 Drawing Sheets

(51) Int. Cl.
*A63F 13/79* (2014.01)
*A63F 13/87* (2014.01)
*A63F 13/35* (2014.01)
*A63F 13/25* (2014.01)
*A63F 13/52* (2014.01)

(56) References Cited

FOREIGN PATENT DOCUMENTS

JP 2014-236785 A 12/2014
WO 2014/128836 A1 8/2014

OTHER PUBLICATIONS

English Translation of Written Opinion of the International Searching Authority for PCT/JP2016/054889 accompanied with PCT/IB/373 and PCT/IB/338 dated Sep. 8, 2017, acting as concise explanation for WO 2014/128836 A1 and JP 2014-236785 A (refereces submitted in this application on Aug. 25, 2017).
"Let's make friends with past and present acquaintances", ASCII PC, ASCII Media Works, Feb. 24, 2012, vol. 15, No. 6, 191th issue, p. 98-p. 101.
Office Action dated Oct. 16, 2018, for corresponding JP Patent Application No. 2017-502327 and English translation thereof.

* cited by examiner

FIG.2

| USER ID | REAL NAME DATA | ICON FILE NAME DATA | PHOTO IMAGE FILE NAME DATA | TERMINAL ID | REAL NAME DISCLOSURE PAGE ID |
|---|---|---|---|---|---|
| aaa001 | Taro | photo01a.jpg | photo01b.jpg | 011, 012 | - |
| bbb002 | George | photo02a.jpg | photo02b.jpg | 021, 022 | 1,2,3,4 |
| ccc003 | Tom | photo03a.jpg | photo03b.jpg | 031, 032 | 3,4 |
| ddd004 | Jiro | photo04a.jpg | photo04b.jpg | 041, 042 | 3,4 |
| eee005 | Denis | photo05a.jpg | photo05b.jpg | 051 | 3,4 |
| fff006 | Georgia | photo06a.jpg | photo06b.jpg | 061 | 1 |
| geo007 | Hanako | photo07a.jpg | photo07b.jpg | 071 | - |
| geon008 | Adolf | photo08a.jpg | photo08b.jpg | 081 | - |
| hhh009 | John | photo09a.jpg | photo09b.jpg | 091 | - |
| iii010 | - | photo10a.jpg | photo10b.jpg | 010 | - |

| USER ID | FRIEND USER ID | REAL NAME DISCLOSURE USER ID |
|---|---|---|
| aaa001 | hhh009,iii010 | hhh009 |
| bbb002 | hhh009,iii010 | — |
| ccc003 | geo007,iii010 | — |
| ddd004 | geon008,iii010 | — |
| eee005 | iii010 | — |
| fff006 | ccc003 | — |
| geo007 | hhh009 | — |
| geon008 | ddd004 | — |
| hhh009 | aaa001,bbb002,iii010 | aaa001 |
| iii010 | aaa001,bbb002,ccc003,ddd004,eee005,hhh009 | — |

| USER ID | FRIEND USER ID | REAL NAME DISCLOSURE USER ID |
|---|---|---|
| aaa001 | hhh009,geo007,iii010 | hhh009 |
| bbb002 | hhh009,iii010 | – |
| ccc003 | geo007,iii010 | – |
| ddd004 | geon008,iii010 | – |
| eee005 | iii010 | – |
| fff006 | ccc003 | – |
| geo007 | aaa001,hhh009 | – |
| geon008 | ddd004 | – |
| hhh009 | aaa001,bbb002,iii010 | aaa001 |
| iii010 | aaa001,bbb002,ccc003,ddd004,eee005,hhh009 | – |

| USER ID | FRIEND USER ID | REAL NAME DISCLOSURE USER ID |
|---|---|---|
| aaa001 | hhh009,geo007,iii010 | geo007,hhh009 |
| bbb002 | hhh009,iii010 | - |
| ccc003 | geo007,iii010 | - |
| ddd004 | geon008,iii010 | - |
| eee005 | iii010 | - |
| fff006 | ccc003 | - |
| geo007 | aaa001,hhh009 | aaa001 |
| geon008 | ddd004 | - |
| hhh009 | aaa001,bbb002,iii010 | aaa001 |
| iii010 | aaa001,bbb002,ccc003,ddd004,eee005,hhh009 | - |

| USER ID | FRIEND USER ID | REAL NAME DISCLOSURE USER ID |
|---|---|---|
| aaa001 | bbb002,hhh009,iii010 | bbb002,hhh009 |
| bbb002 | aaa001,hhh009,iii010 | aaa001 |
| ccc003 | geo007,iii010 | – |
| ddd004 | geon008,iii010 | – |
| eee005 | iii010 | – |
| fff006 | ccc003 | – |
| geo007 | hhh009 | – |
| geon008 | ddd004 | – |
| hhh009 | aaa001,bbb002,iii010 | aaa001 |
| iii010 | aaa001,bbb002,ccc003,ddd004,eee005,hhh009 | – |

FIG. 26

| SOURCE USER ID | DESTINATION USER ID | REQUEST TYPE DATA | SENT DATE AND TIME DATA | MESSAGE DATA |
|---|---|---|---|---|
| aaa001 | bbb002 | Friend Request | 2015/1/23 | Hi, this is Taro. Please be my Friend! |
| aaa001 | bbb002 | Real Name Request | – | – |
| aaa001 | gec007 | Friend Request | 2015/1/23 | Please be my Friend! |

FIG. 30

| SOURCE USER ID | DESTINATION USER ID | REQUEST TYPE DATA | SENT DATE AND TIME DATA | MESSAGE DATA |
|---|---|---|---|---|
| aaa001 | bbb002 | Close Friend Request | 2015/1/23 | Hi, this is Taro. Please be my Friend! |
| aaa001 | geo007 | Friend Request | 2015/1/23 | Please be my Friend! |

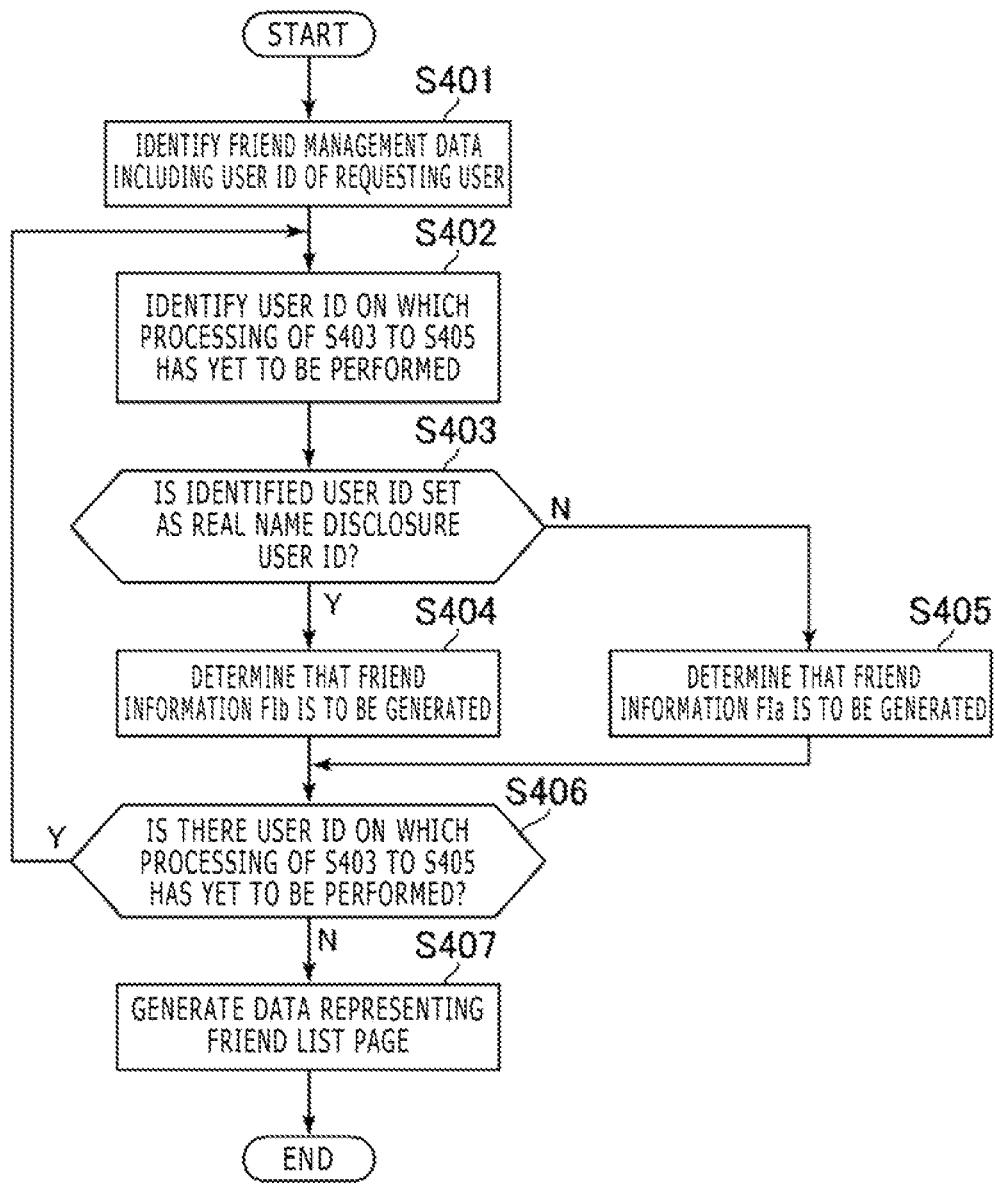

USER MANAGEMENT SERVER, TERMINAL, INFORMATION DISPLAY SYSTEM, USER MANAGEMENT METHOD, INFORMATION DISPLAY METHOD, PROGRAM, AND INFORMATION STORAGE MEDIUM

CROSS REFERENCE TO RELATED APPLICATIONS

This application is a National Stage of International Application No. PCT/JP2016/054889 filed on Feb. 19, 2016, which claims priority from Japanese Patent Application 2015-039037, filed on Feb. 27, 2015. The contents of the above documents are incorporated herein by reference in their entirety.

TECHNICAL FIELD

The present invention relates to a user management server, a terminal, an information display system, a user management method, an information display method, a program, and an information storage medium.

BACKGROUND ART

In recent years, there have appeared social networking online services that allow multiple users to exchange messages with each other or play games together over networks (e.g., see PTL 1). Such services enable each user to register another user as his or her friend (pal) and to communicate with the registered friends.

On the above-mentioned services, the users registered as a user's friends can include persons in diverse relations to the user. For example, a person met only on the network and a person already known in the real world may both be registered as friends. In such a case, there is a need for the user to identify oneself selectively by changing names depending on the relation to each friend. For example, the user may disclose his or her real name to a closely related user but want to withhold the real name from a loosely related user. The need is met for example by techniques disclosed in PTL 1 cited below, the disclosed techniques allowing each user to control his or her names to be disclosed to other users.

CITATION LIST

Patent Literature

[PTL 1]
PCT Patent Publication No. WO2014/128836

SUMMARY

Technical Problem

According to the techniques described in PTL 1, however, it is necessary for each user to perform operations to register the users from whom the user's real name is to be withheld, before carrying out operations to register the users to whom the real name is disclosed. This is a time-consuming chore.

The present invention has been made in view of the above circumstances. An object of the invention is to provide a user management server, a terminal, an information display system, a user management method, an information display method, a program, and an information storage medium for enabling a user to have less trouble than with existing techniques in registering users disclosing their real names.

Solution to Problem

In solving the above problem and according to the present invention, there is provided a user management server including a first registration part configured such that in response to a first operation to designate a user, the first registration part registers the user as a user in a first relation involving disclosure of a nickname, a second registration part configured such that in response to a second operation to designate a user already registered as a user in the first relation, the second registration part registers the user as a user in a second relation involving disclosure of a real name as well, and a third registration part configured such that in response to a third operation to designate a user not registered as a user in the first relation, the third registration part registers the user as a user in the first and the second relations.

Also according to the present invention, there is provided a terminal including a first reception part configured to receive a first operation to designate a user as a user in a first relation involving disclosure of a nickname, a second reception part configured to receive a second operation to designate a user already designated by the first operation, as a user in a second relation involving disclosure of a real name as well, a third reception part configured to receive a third operation to designate a user yet to be designated by the first operation, as a user in the first and the second relations, and a display processing part configured to display a list of information about the users who are in the first relation, the list including the real names of the users in the second relation.

Also according to the present invention, there is provided an information display system including a first registration part configured such that in response to a first operation to designate a user, the first registration part registers the user as a user in a first relation involving disclosure of a nickname, a second registration part configured such that in response to a second operation to designate a user already registered as a user in the first relation, the second registration part registers the user as a user in a second relation involving disclosure of a real name as well, a third registration part configured such that in response to a third operation to designate a user not registered as a user in the first relation, the third registration part registers the user as a user in the first and the second relations, and a display processing part configured to display a list of information about the users who are in the first relation, the list including the real names of the users registered as users in the second relation.

Also according to the present invention, there is provided a user management method including a step of, in response to a first operation to designate a user, registering the user as a user in a first relation involving disclosure of a nickname. The user management method further includes a step of, in response to a second operation to designate a user already registered as a user in the first relation, registering the user as a user in a second relation involving disclosure of a real name as well. The user management method further includes a step of, in response to a third operation to designate a user not registered as a user in the first relation, registering the user as a user in the first and the second relations.

Also according to the present invention, there is provided an information display method including the steps of receiving a first operation to designate a user as a user in a first relation involving disclosure of a nickname, receiving a second operation to designate a user already designated by the first operation, as a user in a second relation involving disclosure of a real name as well, receiving a third operation to designate a user yet to be designated by the first operation, as a user in the first and the second relations, and displaying a list of information about the users who are in the first relation, the list including the real names of the users in the second relation.

Also according to the present invention, there is provided a program for causing a computer to execute a procedure including receiving a first operation to designate a user as a user in a first relation involving disclosure of a nickname, receiving a second operation to designate a user already designated by the first operation, as a user in a second relation involving disclosure of a real name as well, receiving a third operation to designate a user yet to be designated by the first operation, as a user in the first and the second relations, and displaying a list of information about the users who are in the first relation, the list including the real names of the users in the second relation.

The above-described program may be stored on a computer-readable information storage medium.

Preferably, in response to an operation to designate a user of whom the real name is displayed, the third registration part may register the user as a user in the first and the second relations.

Preferably, in response to an operation to designate a user of whom the real name is not displayed in a list of information about candidate users for the first relation, the first registration part may register the user as a user in the first relation. In response to an operation to designate a user of whom the real name is displayed in the list of the information about the candidates, the third registration part may register the user as a user in the first and the second relations.

BRIEF DESCRIPTION OF DRAWINGS

FIG. 2 is a tabular view showing typical user management data.

FIG. 26 is a tabular view showing typical relation request management data.

FIG. 30 is a tabular view showing other typical relation request management data.

FIG. 31 is a flowchart showing another typical flow of the processing performed by the information processing system as the present embodiment.

DESCRIPTION OF EMBODIMENT

One preferred embodiment of the present invention is described below with reference to the accompanying drawings.

Configuration

Figure 1:
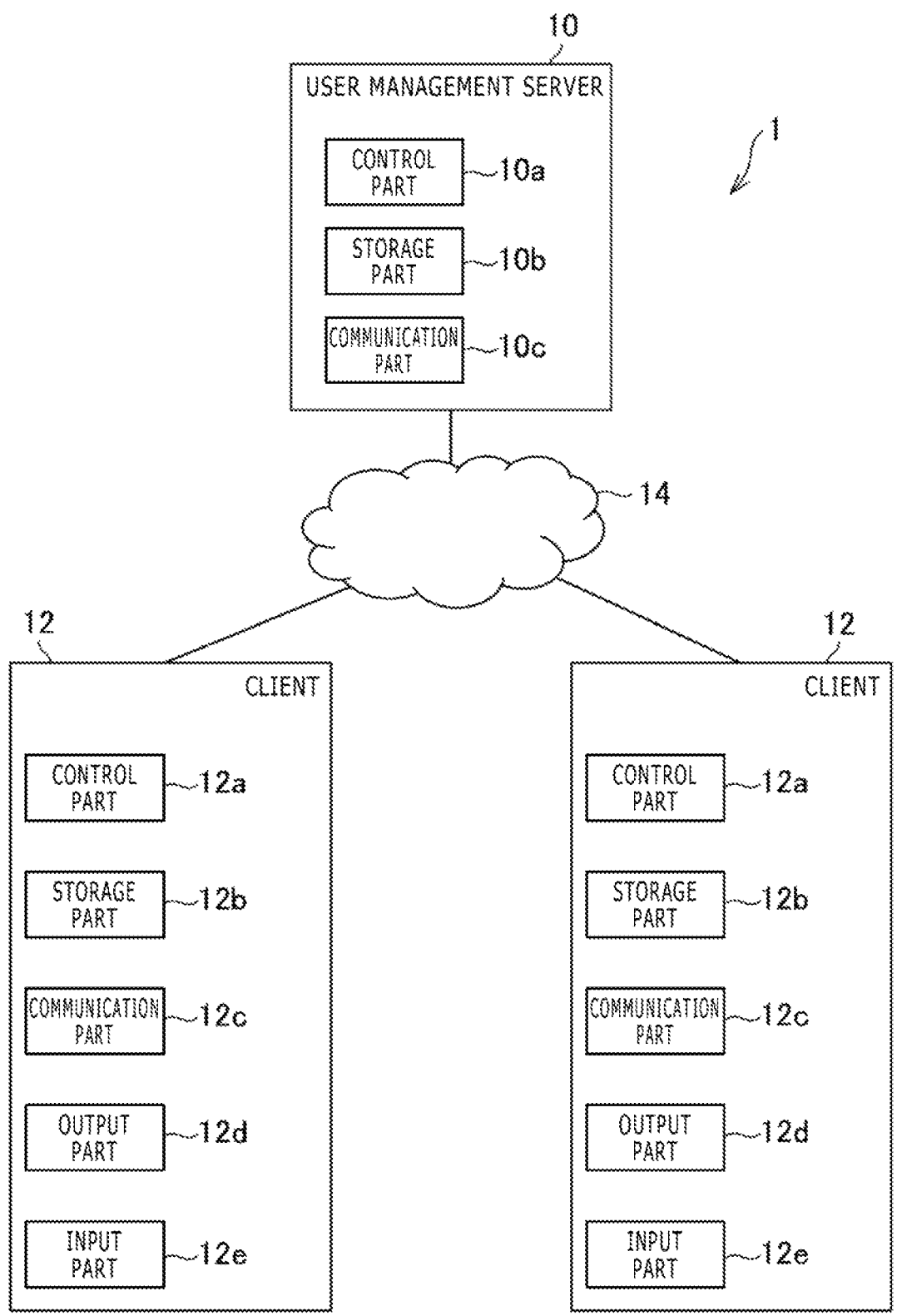
FIG. 1 is a schematic view showing an overall configuration of an information processing system as one embodiment of the present invention.

FIG. 1 is a schematic view showing an overall configuration of an information processing system 1 as one embodiment of the present invention. As shown in FIG. 1, the information processing system 1 of the present embodiment includes a user management server 10 and multiple clients 12, each of them being configured to center on a computer. The user management server 10 and the clients 12 are connected with a computer network 14 such as the Internet. The user management server 10 and the client 12 are communicable with one another.

The information processing system 1 of the present embodiment provides social networking online services for multiple users, such as an online game service allowing multiple user to participate in and play games together.

The user management server 10 is a server computer that manages information about the users making use of the online service of the present embodiment. As shown in FIG. 1, the user management server 10 of the present embodiment typically includes a control part 10a, a storage part 10b, and a communication part 10c. The control part 10a is a program control device such as a central processing unit (CPU) that executes diverse information processing in accordance with programs stored in the storage part 10b. The storage part 10b is typically a storage element such as a read-only memory (ROM) or a random access memory (RAM), or a hard disk drive. The communication part 10c is typically a communication interface that sends and receives data to and from the clients 12 via the computer network 14. The user management server 10 sends and receives information to and from each client 12 by way of the communication part 10c.

Each client 12 is an information processing terminal used by each user making use of the online service of the present embodiment. For example, the client 12 is a personal computer, a game console, a television (TV) set, a portable game device, a smartphone, or a tablet terminal. As shown in FIG. 1, each client 12 of the present embodiment may include a control part 12a, a storage part 12b, a communication part 12c, an output part 12d, and an input part 12e. The control part 12a is a program control device such as a CPU that executes diverse information processing in accordance with programs stored in the storage part 12b. The control part 12a of the present embodiment also includes a graphics processing unit (GPU) that renders images in a frame buffer based on graphics commands and data supplied from the CPU. The storage part 12b may be a storage element such as a ROM or a RAM, or a hard disk drive. The storage part 12b stores, among others, the programs to be executed by the control part 12a. The storage part 12b of the present embodiment provides a frame buffer area where images are rendered by the GPU. The communication part 12c may be a communication interface that sends and receives data to and from the user management server 10 via the computer network 14. Each client 12 sends and receives information to and from the user management server 10 and other clients 12 by way of the communication part 12c. The output part 12d may be formed by speakers for audio output and by a display unit for outputting information display in accordance with instructions input from the control part 12a. The input part 12e is typically made up of a game controller, a touch pad, a mouse, a keyboard, and/or a microphone for outputting to the control part 12a the content of operations performed by the user.

User Management Data

In the present embodiment, the user management server 10 manages the information about users and about the relations therebetween. FIG. 2 is a tabular view showing typical user management data for managing the information about the users making use of the online service of the present embodiment. In the present embodiment, when a user starts using the online service of the present embodiment for the first time, for example, the user is presumed to register his or her user management data.

As shown in FIG. 2, the user management data of the present embodiment may include user identifiers (IDs), real name data, icon file name data, photo image file name data, terminal IDs, and real name disclosure page IDs.

The user IDs included in the user management data are the identification names uniquely identifying the users making use of the online service. The users making use of the online service of the present embodiment are presumed to register their nicknames as the user IDs. Thus the present embodiment provides one-to-one correspondence between the user management data and the users making use of the online service.

The real name data included in the user management data denote the names registered by the users corresponding to the user management data. The users making use of the online service of the present embodiment are presumed to register their real names as values of the real name data.

Some clients 12 may be devoid of the function of allowing a real name to be registered. The users using such a client 12 do not have their real name data values registered, as in the case of a user with a user ID "iii010" in the user management data shown in FIG. 2.

The icon file name data included in the user management data denote the file names of icon images I1 (see FIG. 4 and others), which are first profile images of the users corresponding to the user management data. The icon images I1 may be prepared beforehand by the information processing system 1.

The photo image file name data included in the user management data denote the file names of photo images I2 (see FIG. 4, etc.), which are second profile images of the users corresponding to the user management data. The photo images I2 are uploaded and registered by the users and are presumed to be photos taken of the users themselves.

The terminal IDs included in the user management data constitute the identification information identifying the clients 12 used by the users corresponding to the user management data. In the present embodiment, as shown in FIG. 2, one user is presumed to use either one client 12 or multiple clients 12 (e.g., a game console and a smartphone).

The real name disclosure page IDs included in the user management data constitute the identification information identifying the pages that enable the users corresponding to the user management data to disclose their real name data included in the user management data to all users. In the present embodiment, the pages identified by the real name disclosure page IDs allow the names indicated by the real name data of the users to be viewed by all users. As shown in FIG. 2, the present embodiment permits each user to set multiple real name disclosure page IDs. For example, suppose that "1" is set as the real name disclosure page ID of a user included in the user management data. In this case, the present embodiment enables all users to view, in a search page 20 (see FIG. 4) to be discussed later, the name indicated by the real name data of the user of interest corresponding to the user management data. Also, the real name data value of the user appears in the result of a search performed by a user in the search page 20.

As another example, suppose that "2" is set as the real name disclosure page ID of a user included in the user management data. In this case, the present embodiment allows all users to view, in an FoF page 36 (see FIG. 21) to be discussed later, the name indicated by the real name data of the user of interest corresponding to the user management data.

As a further example, suppose that "3" is set as the real name disclosure page ID of a user included in the user management data. In this case, the present embodiment allows all users to view, in a YMK page 38 (see FIG. 22) to be discussed later, the name indicated by the real name data of the user of interest corresponding to the user management data.

As a still further example, suppose that "4" is set as the real name disclosure page ID of a user included in the user management data. In this case, the present embodiment allows all users to view, in an SNS friend finding page 40 (see FIG. 23) to be discussed later, the name indicated by the real name data of the user of interest corresponding to the user management data.

Friend Management Data

The present embodiment further allows each user whose user management data has been registered to register another user as a friend (pal). In the present embodiment the friends registered by each user are managed as the friend management data shown in FIG. 3.

Figures 3, 4:
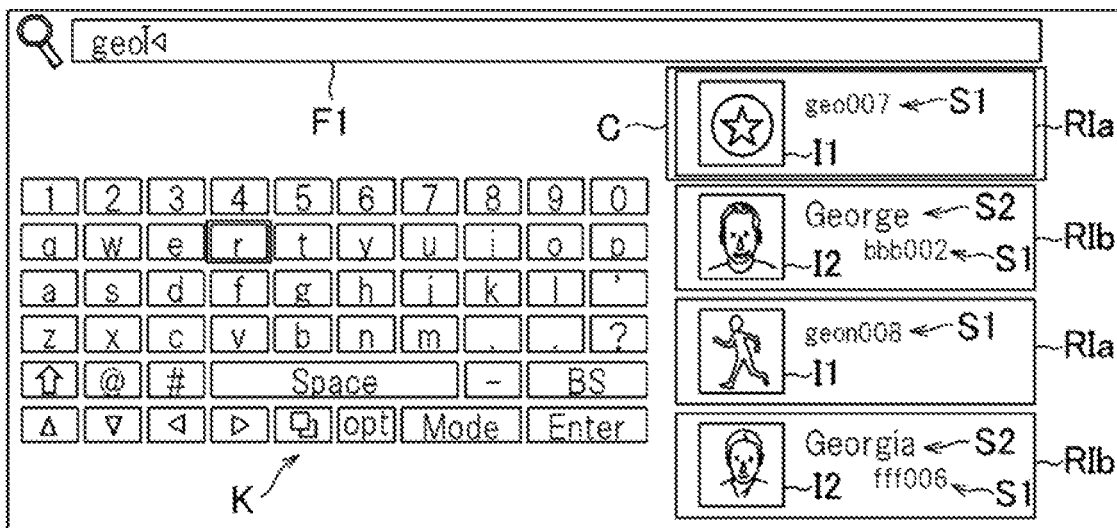
FIG. 3 is a tabular view showing typical friend management data.
FIG. 4 is a schematic view showing a typical search page.

As shown in FIG. 3, the friend management data of the present embodiment may include user IDs, friend user IDs, and real name disclosure user IDs.

The user IDs included in the friend management data are the identification names uniquely identifying the users making use of this online service. Thus the present embodiment provides one-to-one correspondence between the friend management data and the users using the online service. Also in the present embodiment, the user management data and the friend management data are associated with one another by the user IDs included in the user management data and by the user IDs included in the friend management data.

The friend user IDs included in the friend management data are the user IDs of the users registered as friends by the users identified by the user IDs included in the friend management data. In the description that follows, the users registered as friends in the friend management data will be referred to as friend users. As shown in FIG. 3, the present embodiment allows each user to register multiple user IDs as friend user IDs.

The real name disclosure user IDs included in the friend management data are the user IDs of the users registered by the users identified by the user IDs included in the friend management data so that these users disclose to each other their names indicated by the real name data. In the ensuing description, the users registered so that their names indicated by the real name data in the friend management data are disclosed to each other will be referred to as the real name disclosure users. In the present embodiment, the users and their real name disclosure users disclose to one another their names indicated by their real name data regardless of the pages identified by the above-mentioned real name disclosure page IDs. As shown in FIG. 3, the present embodiment allows each user to register multiple user IDs as the real name disclosure user IDs. Also, the present embodiment requires that a real name disclosure user be always registered as a friend user. That is, the user IDs registered as the real name disclosure user IDs in the friend management data are to be always registered as the friend user IDs as well.

The user management data and the friend management data of the present embodiment are stored in the storage part 10b of the user management server 10.

Outline of Relation Request

The present embodiment allows each user to request another user yet to be a friend user of the user, to be registered as a friend. If the user requested to be registered as a friend accepts the request, then the requesting user and the accepting user are associated with each other as friend users. In the present embodiment, for example, the user ID of the accepting user is registered as a friend user ID in the friend management data of the requesting user. The user ID of the requesting user is registered as a friend user ID in the friend management data of the accepting user.

The present embodiment allows each user to request another user, who is a friend user but not a real name disclosure user of the user yet, to disclose the other user's real name. If the user requested to disclose his or her real name accepts the request, then the requesting user and the accepting user are associated with each other as real name disclosure users. In the present embodiment, for example, the user ID of the accepting user is registered as a real name disclosure user ID in the friend management data of the requesting user. The user ID of the requesting user is registered as a real name disclosure user ID in the friend management data of the accepting user.

The present embodiment allows each user to request another user, yet to be a friend user of the user, to be registered as a close friend. If the user requested to be registered as a close friend accepts the request, then the requesting user and the accepting user are associated with each other as friend users and as real name disclosure users as well. In the present embodiment, for example, the user ID of the accepting user is registered as a friend user ID and as a real name disclosure user ID in the friend management data of the requesting user. The user ID of the requesting user is registered as a friend user ID and as a real name disclosure user ID in the friend management data of the accepting user.

In the friend management data of the present embodiment, as described above, the relation between two users one of whom requested disclosure of the real name of the other user who accepted the request is treated to be equivalent to the relation between two users one of whom requested registration as a close friend of the other user who accepted the request.

In the description that follows, the user who requests another user to be registered as a friend, to disclose his or her real name, or to be registered as a close friend will be referred to as the requesting user, and the user accepting the request will be referred to as the accepting user. When the requesting user performs an operation to request another user to be registered as a friend, the present embodiment causes the client 12 of the requesting user to send the request to the client 12 of the accepting user. This request will be referred to as the friend request hereunder. Also, when the requesting user performs an operation to request another user to disclose his or her real name, the present embodiment causes the client 12 of the requesting user to send the request to the client 12 of the accepting user. This request will be referred to as the real name request hereunder. Further, when the requesting user performs an operation to request another user to be registered as a close friend, the present embodiment causes the client 12 of the requesting user to send the request to the client 12 of the accepting user. This request will be referred to as the close friend request in the ensuing description. The friend request, the real name request, and the close friend request will be generically referred to as the relation request hereunder.

Request for Registration as Friend and Acceptance of Request

Explained below is an example in which a user having a user ID "aaa001" requests another user having a user ID "geo007" to be registered as a friend and the other user accepts the request. It is assumed here that before the request is made and accepted, the friend management data shown in FIG. 3 are stored in the storage part 10b of the user management server 10.

FIG. 4 shows a typical search page 20 displayed on the display unit of the client 12 used by the requesting user. The search page 20 is designed to receive the input, through an on-screen keyboard K, of a character string constituting a search condition into a search condition input form F1. When the character string of the search condition is input, the information about the users whose user IDs match partially or completely the search condition is brought to the search page 20 as search result information RI. In this manner, the present embodiment causes the search page 20 to provide a list of the search result information RI.

Also in the present embodiment, the real name disclosure users and the users having "1" set as the real name disclosure page ID included in the user management data have not only their user IDs but also their names indicated by the real name data targeted for search. Thus the information about these users is listed in the search page 20 as the search result information RI also when the character strings indicated by their real name data match partially or completely the character string of the search condition.

For the users whose names indicated by their real name data are not targeted for search, the present embodiment provides search result information RIa that includes the character strings 31 representing the user IDs of these users tougher with their icon images I1. For the users whose names indicated by their real name data are targeted for search, the present embodiment provides search result information RIb that includes the character strings S1 representing the user IDs of these users, the character strings S2 representing the names indicated by their real name data, and their photo images I2.

The present embodiment allows the requesting user to select the search result information RI by performing operations to move a cursor C over the search page 20. As shown in FIG. 4, the present embodiment displays the cursor C encircling the search result information RI to be selected. If the requesting user performs a predetermined determining operation at this point, the search result information RI encircled by the cursor C is determined as the selected search result information RI. Suppose now that the search result information RIa about the accepting user with the user ID "geo007" is selected. In this case, the display unit of the client 12 used by the requesting user displays a profile page 22 shown in FIG. 5, indicating profile information about the user corresponding to the selected search result information RIa.

If the search result information RIa having no character string S2 representing the name indicated by the real name data is selected, the present embodiment causes the profile page 22 to be displayed showing the character string S1 and the icon image I1 included in the search result information RIa. The profile page 22 illustrated in FIG. 5 thus shows the icon image I1 as well as the character string S1 representing the user ID of the user corresponding to the selected search result information RIa.

If no character string S2 is included in the selected search result information RIa and if the user corresponding to the search result information RIa is not a friend user, the present embodiment causes the profile page 22 including a friend request button B1 to be displayed. The profile page 22 illustrated in FIG. 5 thus includes the friend request button B1.

As described above, in accordance with the settings of the real name disclosure page IDs included in the user management data, the present embodiment controls whether or not to disclose the name indicated by the real name data of a given user to all users as a search target. Also, in keeping with the settings of the real name disclosure page IDs, the present embodiment controls whether or not to disclose the photo image I2 of the user of interest to all users.

The user may not remember the user ID of a given real name disclosure user but is presumed to recall his or her real name. Because the present embodiment permits a search for a real name disclosure user based on his or her real name, it is easy for each user to search for a desired real name disclosure user. Since the photo image I2 of each real name disclosure user is provided as search result information RIb, it is easy to find the desired real name disclosure user from the list of the search result information RI.

Figure 5:
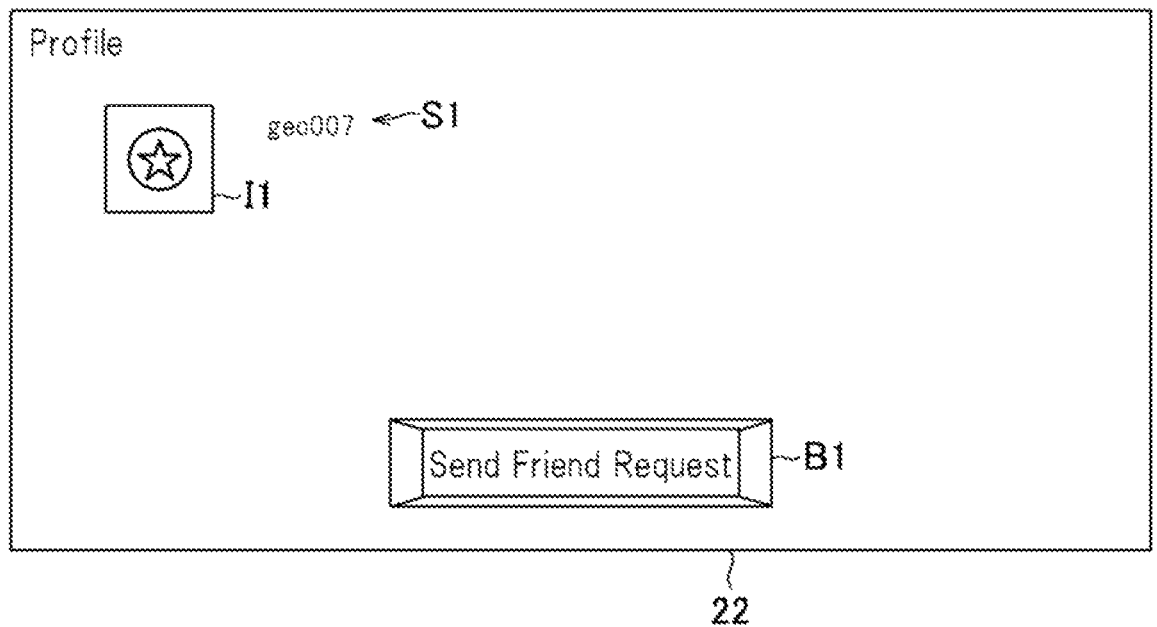
FIG. 5 is a schematic view showing a typical profile page.
Figure 6:
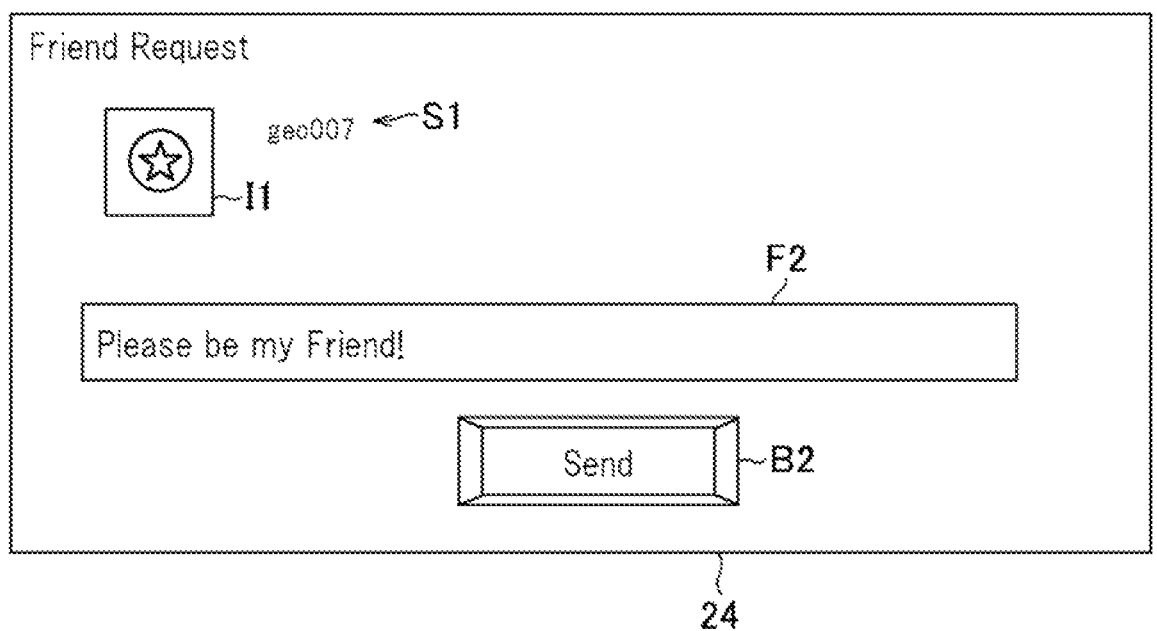
FIG. 6 is a schematic view showing a typical friend request sending page.

If the requesting user performs an operation to select the friend request button B1 during display of the profile page 22 shown in FIG. 5, the display unit of the client 12 used by the requesting user displays a friend request sending page 24 illustrated in FIG. 6. The friend request sending page 24 illustrated in FIG. 6 includes the character string S1 representing the user ID of the user corresponding to the selected search result information RIa and the icon image I1 of the user. The friend request sending page 24 further includes a message input form F2 and a sending button B2. A default message is already input in the message input form F2. The user may edit this message.

If the requesting user performs an operation to select the sending button B2, a friend request is sent to the user whose user ID is "geo007." In the present embodiment, the sending of the friend request corresponds to the above-described request for registration as a friend. The operation corresponding to the request for friend registration will be referred to as the friend registration requesting operation in the ensuing description.

In turn, a notification that data has been sent to the accepting user is pushed to the client 12 used by the accepting user. When the accepting user performs predetermined operations, the display unit of the client 12 used by the accepting user displays a notification page 26 shown in FIG. 7.

Figure 7:
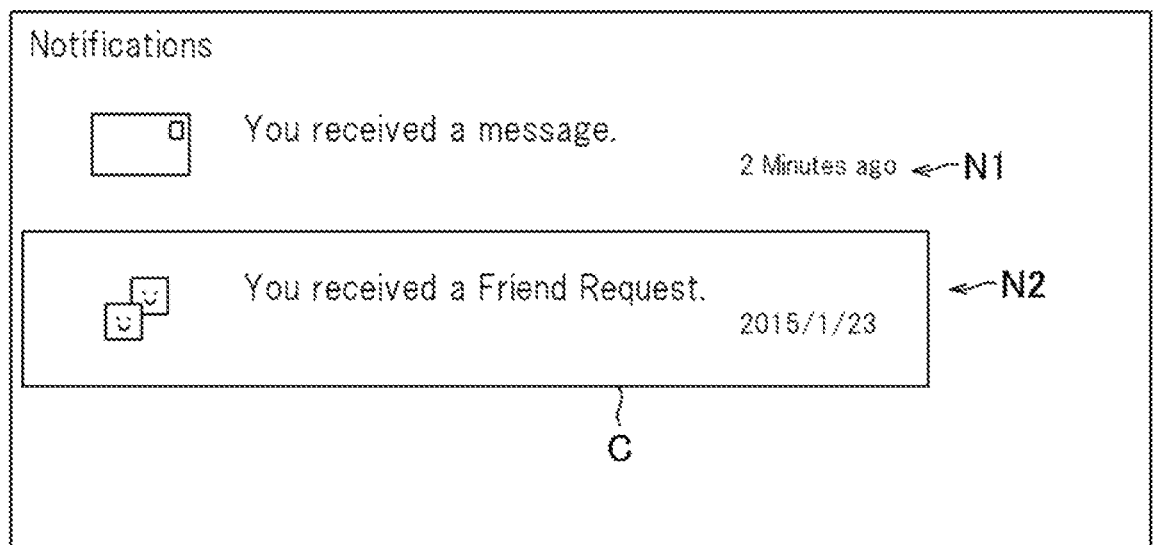
FIG. 7 is a schematic view showing a typical notification page.

The notification page 26 illustrated in FIG. 7 shows the notification information corresponding to the type of the data addressed to the accepting user. The example of FIG. 7 includes notification information N1 corresponding to the most recent message addressed to the accepting user, and notification information N2 corresponding to the most recent relation request addressed to the accepting user. The notification information N2 shown in FIG. 7 indicates that the most recent relation request addressed to the accepting user is a friend request.

Suppose now that the accepting user operates the cursor C to select the notification information N2 in the notification page 26 shown in FIG. 7. In this case, the display unit of the client 12 used by the accepting user displays a request list page 28 shown in FIG. 8. The request list page 28 includes received request information RR corresponding to a received relation request and sent request information SR corresponding to a sent relation request. In the ensuing description, the received request information RR and the sent request information SR will be generically referred to as the request information.

The received request information RR includes the icon image I1 of a source user having sent the relation request and the character string S1 representing the user ID of that user. The received request information RR also includes a character string S3 representing the type of the relation request, information T representing the sent timing of the relation request, and a message M input in the message input form F2. In this example, the character string S3 representing the type of the relation request indicates that the relation request is a friend request. The sent request information SR includes the icon image I1 of the user to whom the relation request was sent, and the character string S1 representing the user ID of that user.

Figure 8:
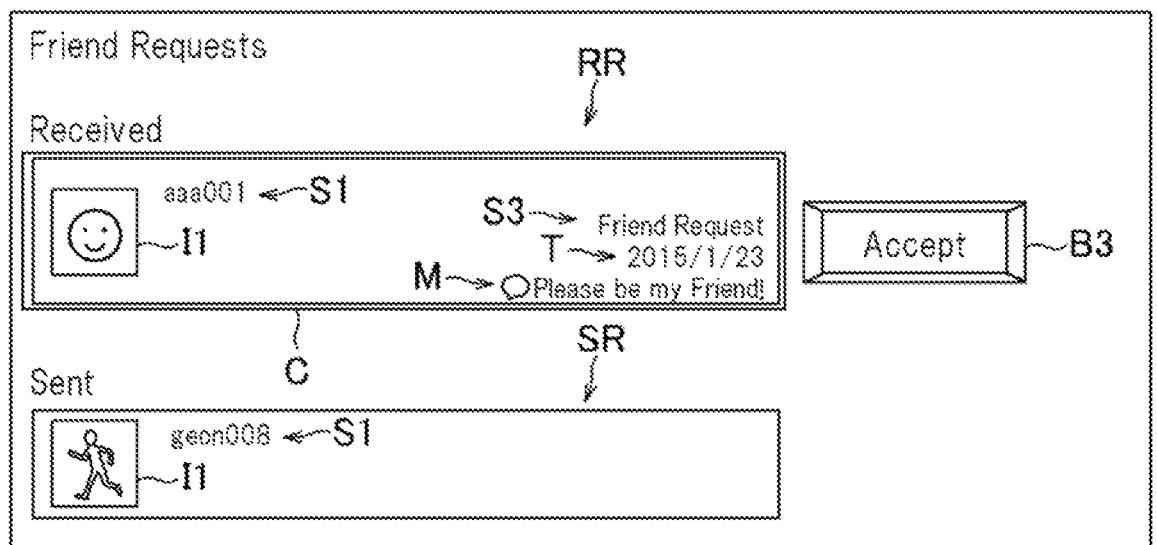
FIG. 8 is a schematic view showing a request list page.
Figures 9, 10:
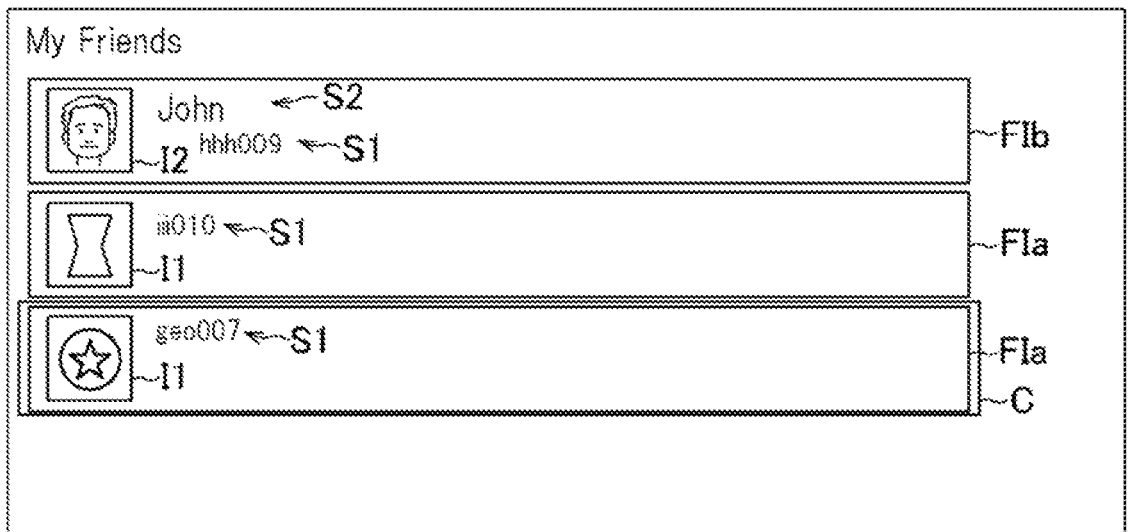
FIG. 9 is a tabular view showing other typical friend management data.
FIG. 10 is a schematic view showing a typical friend list page.

The request list page 28 shown in FIG. 8 also includes an accepting button B3 corresponding to the received request information RR. If the accepting user performs an operation to select the accepting button B3, the requesting user and the accepting user are associated with each other as friend users as described above. The operation to accept the request from the requesting user will be referred to as the accepting operation in the ensuing description. In this case, the received request information RR is deleted from the request list page 28. In the present embodiment, for example, establishing the association causes the friend management data stored in the storage part 10b of the user management server 10 to be updated from what is shown in FIG. 3 to what is indicated in FIG. 9. In FIG. 9, the friend user ID "geo007" is added to the friend management data of which the user ID is "aaa001." Also in FIG. 9, the friend user ID "aaa001" is added to the friend management data of which the user ID is "geo007."

The accepting user may select the request information by performing operations to move the cursor C over the request list page 28 shown in FIG. 8. In the present embodiment, as indicated in FIG. 8, the cursor C is shown encircling the request information to be selected. If the accepting user performs a predetermined determining operation at this point, the request information encircled by the cursor C is determined as the selected request information. The profile page 22 corresponding to the selected request information is then displayed on the display unit of the client 12 used by the accepting user. If the received request information RR is selected at this point, the profile page 22 of the source user having sent the relation request is displayed. If the sent request information SR is selected, the profile page 22 of a destination user to whom the relation request is sent is displayed. The present embodiment permits operations to be performed to accept the request corresponding to the received relation request or to delete the received or sent relation request through the profile pages 22.

The request list page 28 may include multiple items of received request information RR. In this case, the accepting button B3 is arranged to correspond to each item of received request information RR.

Request for and Acceptance of Real Name Disclosure

Explained below is an example in which a user having a user ID "aaa001" requests another user having a user ID "geo007" to disclose his or her real name and the other user accepts the request. It is assumed here that before the request is made and accepted, the friend management data shown in FIG. 9 are stored in the storage part 10b of the user management server 10. That is, the user with the user ID "aaa001" and the user with the user ID "geo007" are assumed to be friend users with each other already.

FIG. 10 shows a typical friend list page 30 displayed on the display unit of the client 12 used by the requesting user. The friend list page 30 includes friend information FI corresponding to the friend users of the requesting user. This is how the friend information FI is listed in the friend list page 30.

In the present embodiment, friend information FIa corresponding to the friend users who are not real name disclosure users is arranged to include the character strings S1 representing the user IDs of these friend users and their icon images I1. Friend information FIb corresponding to the friend user whose is also a real name disclosure user is arranged to include the character string S1 representing the user ID of that friend user, the character string S2 representing the name indicated by the real name data of the friend user, and his or her photo image I2.

The present embodiment allows the requesting user to perform operations to move the cursor C over the friend list page 30 in order to select the friend information FI. In the present embodiment, as indicated in FIG. 10, the cursor C is shown encircling the friend information FI to be selected. If the requesting user performs a predetermined determining operation at this point, the friend information FI encircled by the cursor C is determined as the selected friend information FI. Suppose now that the friend information FIa about the accepting user with the user ID "geo007" is selected. In this case, the display unit of the client 12 used by the requesting user displays a profile page 22 shown in FIG. 11, indicating profile information about the user corresponding to the selected friend information FIa.

If the friend information FIa with no character string S2 representing the name indicated by the real name data is selected, the present embodiment permits display of a profile page 22 that includes the character string S1 and the icon image I1 found in the friend information FIa. Thus the profile page 22 illustrated in FIG. 11 includes the character string S1 representing the user ID of the user corresponding to the selected friend information FIa and the icon image I1 of that user.

If the character string S2 is not included in the selected friend information FIa and if the user corresponding to the selected friend information FIa is not a real name disclosure user, the present embodiment permits display of a profile page 22 that includes a real name request button B4. Thus the profile page 22 illustrated in FIG. 11 includes the real name request button B4.

Figure 11:
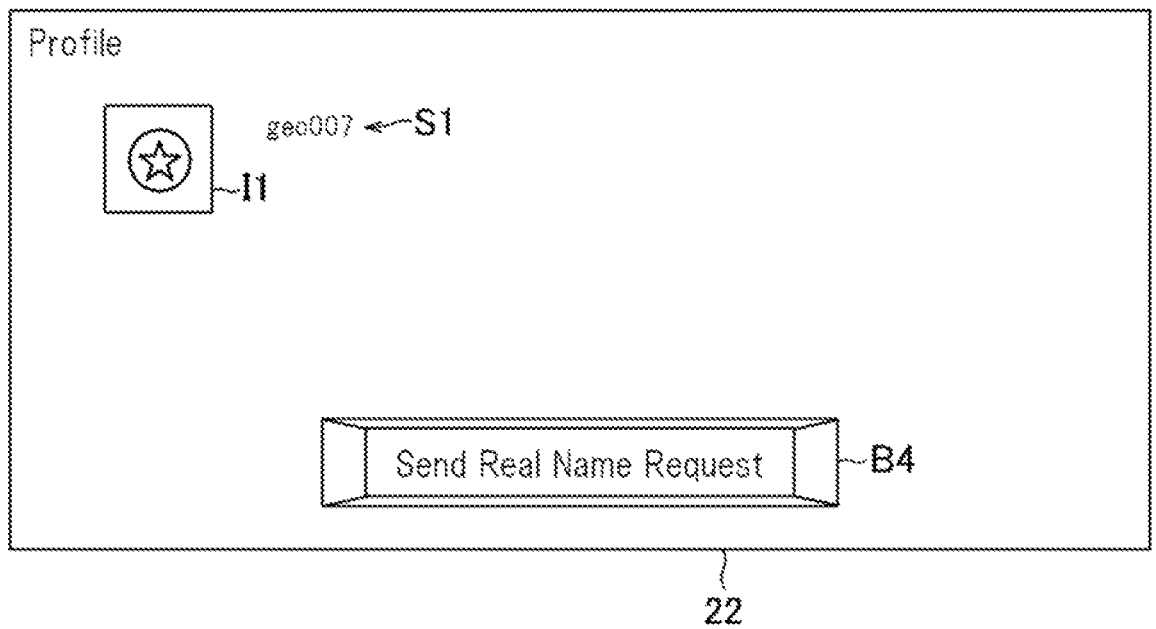
FIG. 11 is a schematic view showing another typical profile page.
Figure 12:
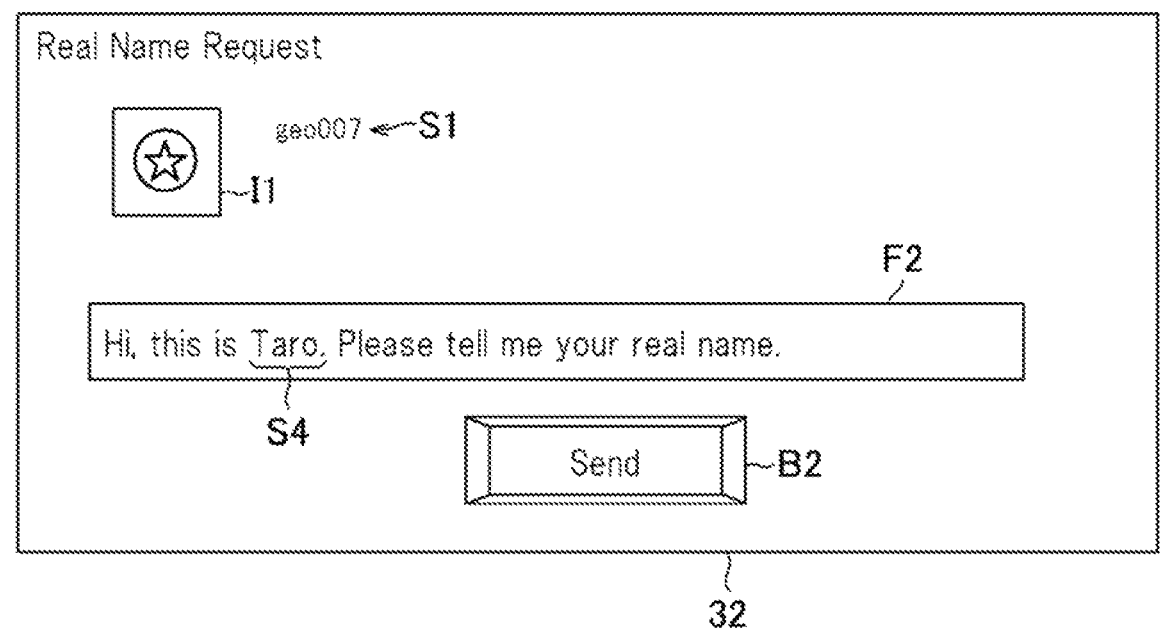
FIG. 12 is a schematic view showing a typical real name request sending page.

If the requesting user performs an operation to select the real name request button B4 during display of the profile page 22 shown in FIG. 11, a real name request sending page 32 illustrated in FIG. 12 is sent to the display unit of the client 12 used by the requesting user. The real name request sending page 32 shown in FIG. 12 includes the character string S1 representing the user ID of the user corresponding to the selected friend information FIa and the icon image I1 of that user. The real name request sending page 32 also includes the message input form F2 and the sending button B2. A default message is already input in the message input form F2. The user may edit this message. In the present embodiment, the default message displayed in the real name request sending page 32 shown in FIG. 12 includes a character string S4 representing the name indicated by the real name data of the requesting user, unlike the friend request sending page 24 shown in FIG. 6.

If the user performs an operation to select the sending button B2 at this point, a real name request is sent to the user having the user ID "geo007." In the present embodiment, the sending of the real name request corresponds to the above-described request for disclosure of a real name. The operation corresponding to the request for real name disclosure will be referred to as the real name disclosure requesting operation hereunder.

In turn, a notification that data has been sent to the accepting user is pushed to the client 12 used by the accepting user. When the accepting user performs predetermined operations, the display unit of the client 12 used by the accepting user displays a notification page 26 shown in FIG. 13.

Figure 13:
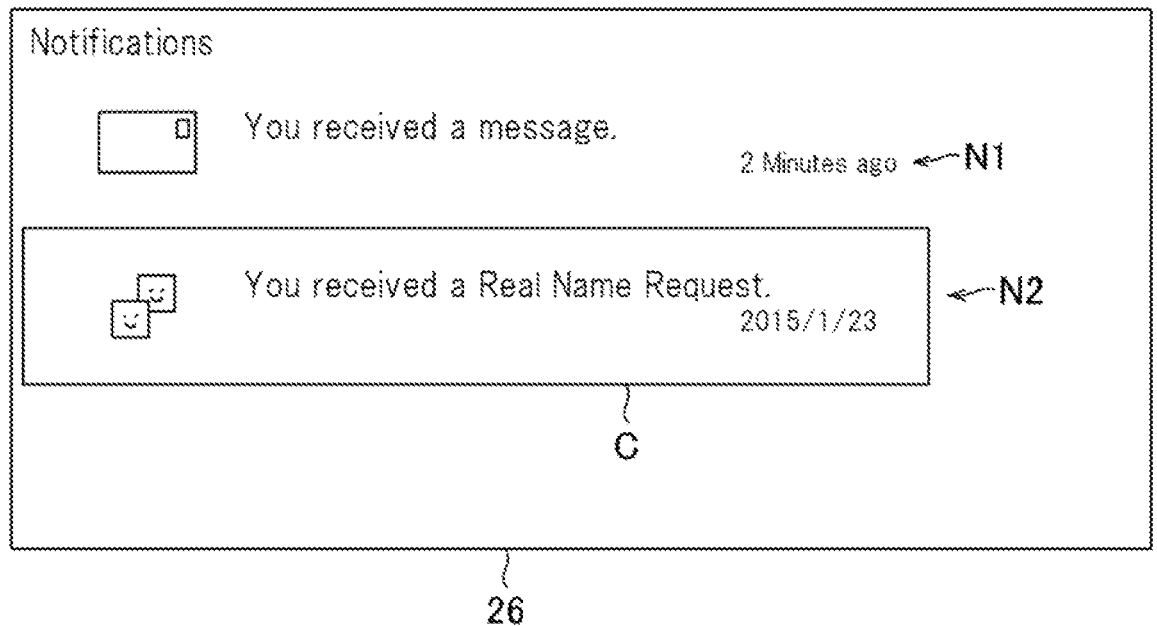
FIG. 13 is a schematic view showing another typical notification page.

The notification page 26 indicated in FIG. 13 shows the notification information corresponding to the type of the data addressed to the accepting user. The notification information N2 shown in FIG. 13 indicates that the most recent relation request addressed to the accepting user is a real name request.

Suppose now that the accepting user operates the cursor C to select the notification information N2 in the notification page 26 shown in FIG. 13. In this case, the display unit of the client 12 used by the accepting user displays a request list page 28 shown in FIG. 14. The request list page 28 includes the request information as in the case of the request list page 28 indicated in FIG. 8.

Figure 14:
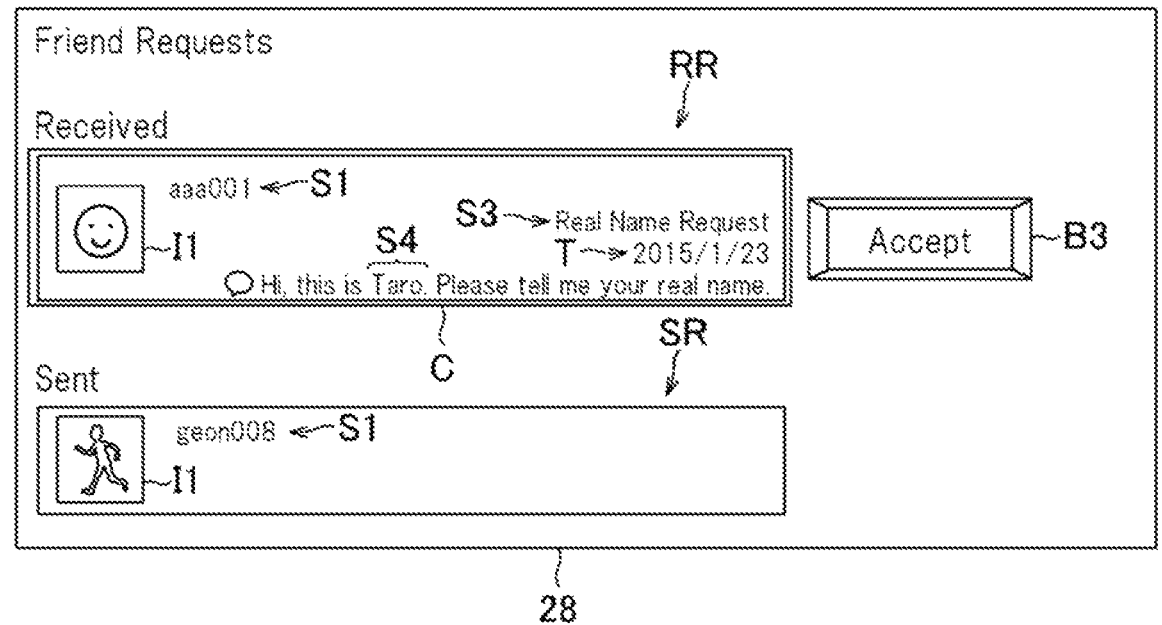
FIG. 14 is a schematic view showing another request list page.

As in the case of FIG. 8, the received request information RR illustrated in FIG. 14 includes the icon image I1, the character string S1, the character string S3, the information T, and the message M. The character string S3 in this case constitutes information indicating that this relation request is a real name request. The sent request information SR includes the icon image I1 and the character string S1, as the case of in FIG. 8.

If the message M includes a character string S4 representing the name indicated by the real name data of the requesting user, then the accepting user is able to know the real name of the user having sent the real name request.

Figures 15, 16:
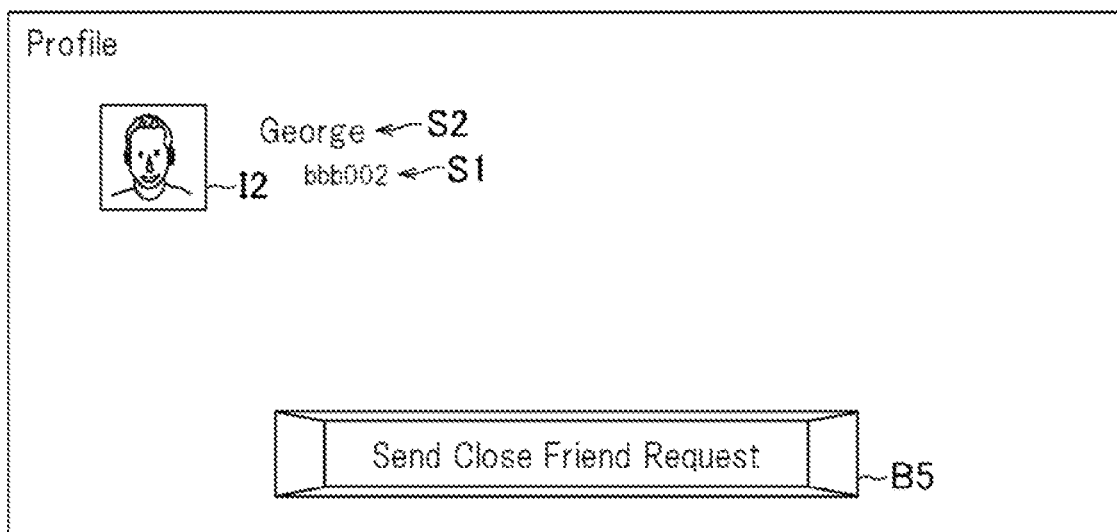
FIG. 15 is a tabular view showing other typical friend management data.
FIG. 16 is a schematic view showing another typical profile page.

Also, as in the case of FIG. 8, the request list page 28 illustrated in FIG. 14 includes the accepting button B3 corresponding to the received request information RR. If the accepting user performs the accepting operation at this point, e.g., carries out an operation to select the accepting button B3, then the requesting user and the accepting user are associated with each other as real name disclosure users as discussed above. In this case, the received request information RR is deleted from the request list page 28. In the present embodiment, for example, establishing the association causes the friend management data stored in the storage part 10b of the user management server 10 to be updated from what is shown in FIG. 9 to what is indicated in FIG. 15. In FIG. 15, the real name disclosure user ID "geo007" is added to the friend management data of which the user ID is "aaa001." Also in FIG. 15, the real name disclosure user ID "aaa001" is added to the friend management data of which the user ID is "geo007."

Also, as in the case of FIG. 6, the accepting user may have display of the profile page 22 corresponding to the request information selected by performing operations to move the cursor C over the request list page 28 illustrated in FIG. 14. The accepting user is allowed to perform operations to accept the request corresponding to the received relation request or to delete the received or sent relation request through the profile page 22.

Request for and Acceptance of Close Friend Registration

Explained below is an example in which a user having a user ID "aaa001" requests another user having a user ID "bbb002" to be registered as a close friend and the other user accepts the request. It is assumed here that before the request is made and accepted, the friend management data shown in FIG. 3 are stored in the storage part 10b of the user management server 10. That is, the user with the user ID "aaa001" and the user with the user ID "geo007" are assumed not to be friend users with each other.

For example, suppose that in the search page 20 shown in FIG. 4, the search result information RIb about the accepting user with the user ID "bbb002" is selected. In this case, the display unit of the client 12 used by the requesting user displays a profile page 22 shown in FIG. 16, indicating the profile information about the user corresponding to the selected search result information RIb.

If the search result information RIb including the character string S2 representing the name indicated by the real name data is selected, the present embodiment provides display of the profile page 22 that includes the character string S1, the character string S2, and the photo image I2 found in the search result information RIb. Thus the profile page 22 shown in FIG. 16 includes the character string S1 representing the user ID of the user corresponding to the selected search result information RIb, the character string S2 representing the name indicated by the real name data of the user, and the photo image I2 of the user.

If the character string S2 is included in the selected search result information RIb and if the user corresponding to the search result information RIb is not a friend user, the present embodiment provides display of a profile page 22 that includes a close friend request button B5. Thus the profile page 22 shown in FIG. 16 includes the close friend request button B2.

Figure 17:
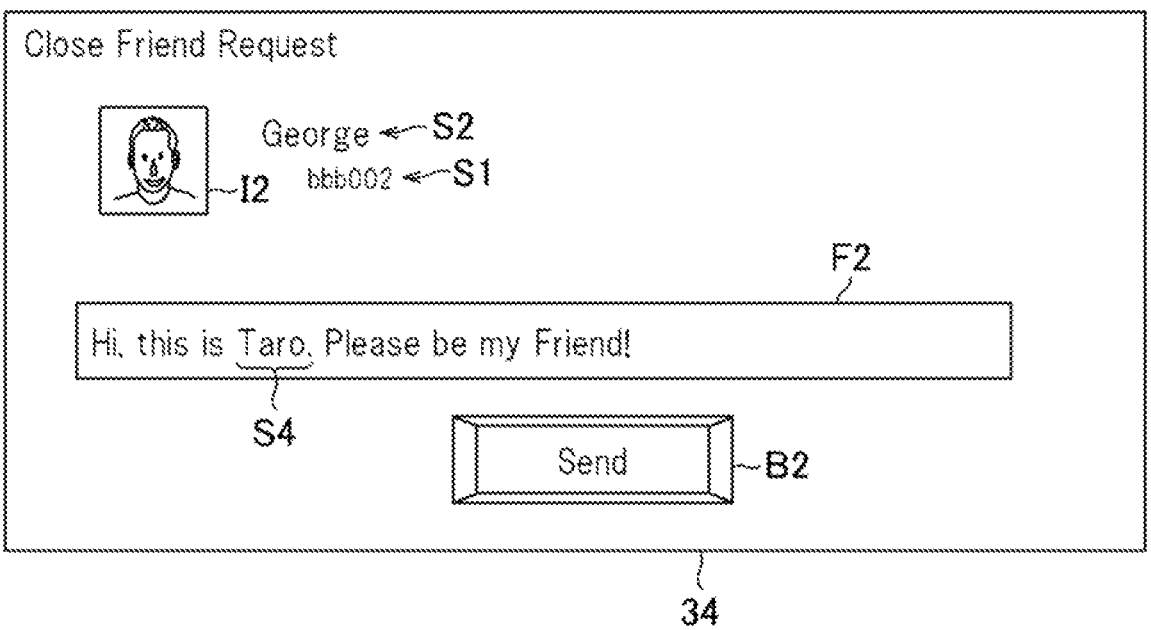
FIG. 17 is a schematic view showing a close friend request sending page.

If the requesting user performs an operation to select the close friend request button B5 during display of the profile page 22 shown in FIG. 16, a close friend request sending page 34 indicated in FIG. 17 is displayed on the display unit of the client 12 used by the requesting user. The close friend request sending page 34 illustrated in FIG. 17 includes the character string S1 representing the user ID of the user corresponding to the selected search result information RIb, the character string S2 representing the name indicated by the real name data of the user, and the photo image I2 of the user. The close friend request sending page 34 further includes the message input form F2 and the sending button B2. A default message is already input in the message input form F2. The user may edit this message. In the present embodiment, the default message displayed in the close friend request sending page 34 shown in FIG. 17 includes a character string S4 representing the name indicated by the real name data of the requesting user, unlike the friend request sending page 24 shown in FIG. 6.

If the requesting user performs an operation to select the sending button B2 at this point, a close friend request is sent to the user having the user ID "bbb002." In the present embodiment, the sending of the close friend request corresponds to the above-described request for registration of a close friend. The operation corresponding to the request for close friend registration will be referred to as the close friend registration requesting operation hereunder.

In turn, a notification that data has been sent to the accepting user is pushed to the client 12 used by the accepting user. When the accepting user performs predetermined operations, the display unit of the client 12 used by the accepting user displays a notification page 26 shown in FIG. 18.

Figure 18:
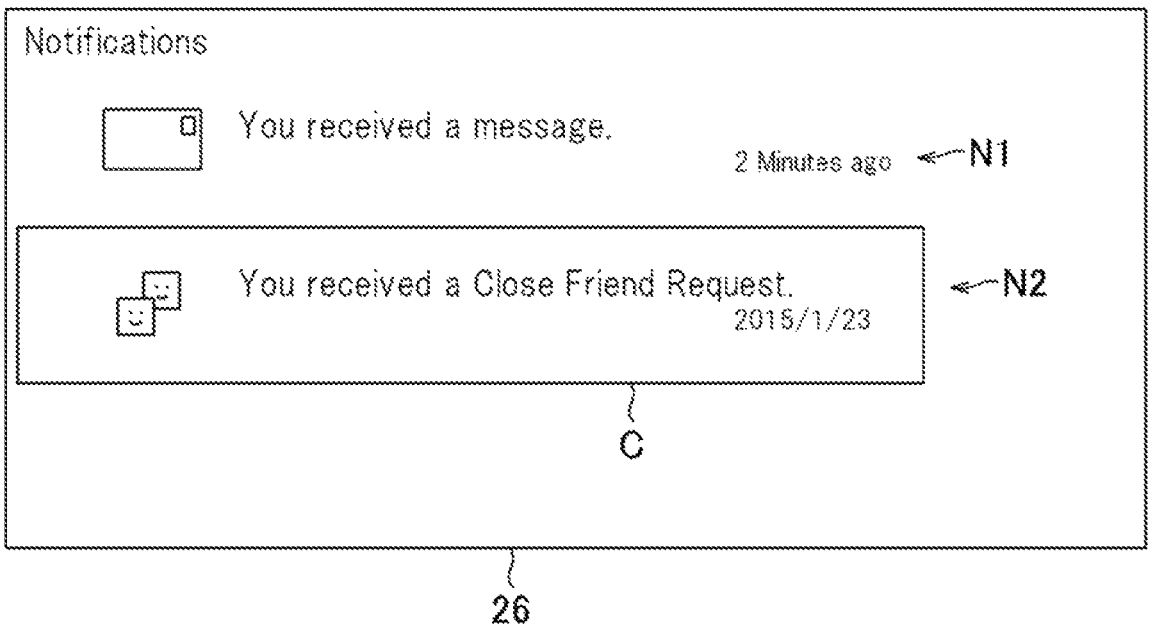
FIG. 18 is a schematic view showing another typical notification page.

The notification page 26 illustrated in FIG. 18 shows the notification information corresponding to the type of the data addressed to the accepting user. The notification information N2 shown in FIG. 18 indicates that the most recent relation request addressed to the accepting user is a close friend request.

Suppose now that the accepting user performs an operation to select the notification information N2 in the notification page 26 of FIG. 18. In this case, the display unit of the client 12 used by the accepting user displays a request list page 28 shown in FIG. 19. The request list page 28 includes the request information as in the case of the request list page 28 indicated in FIGS. 8 and 14.

Figures 19, 20:
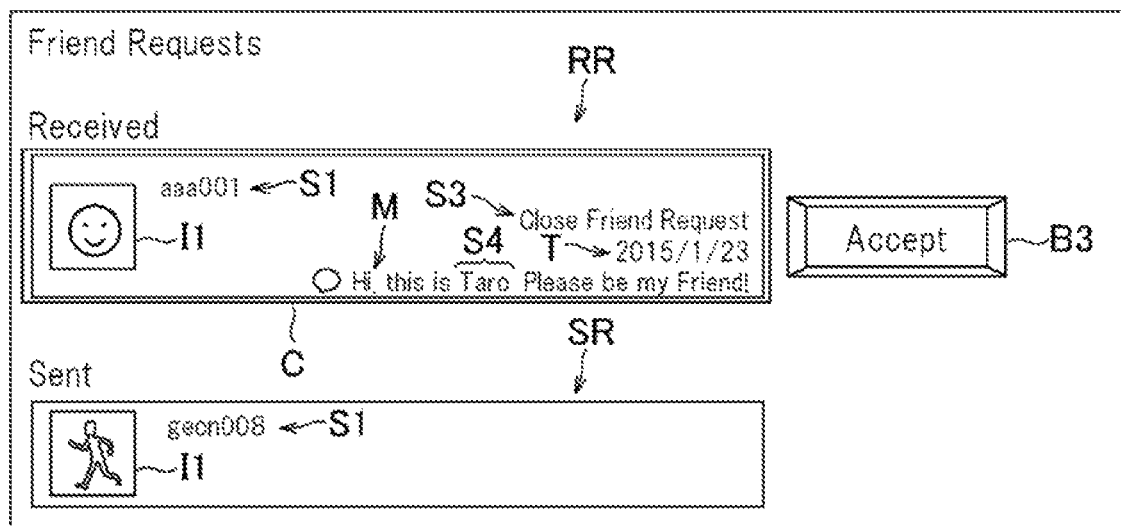
FIG. 19 is a schematic view showing another typical request list page.
FIG. 20 is a tabular view showing other typical friend management data.

As in the case of FIGS. 8 and 14, the received request information RR illustrated in FIG. 19 includes the icon image I1, the character string S1, the character string S3, the information T, and the message M. The character string S3 in this case constitutes information indicating that this relation request is a close friend request. The sent request information SR includes the icon image I1 and the character string S1, as in the case of FIGS. 8 and 14.

If the message M includes a character string S4 representing the name indicated by the real name data of the requesting user, then the accepting user is able to know the real name of the user having sent the close friend request.

Incidentally, the received request information RR shown in FIG. 19 may include the character string S2 and the photo image I2.

Also, as in the case of in FIGS. 8 and 14, the request list page 28 illustrated in FIG. 19 includes the accepting button B3 corresponding to the received request information RR. If the accepting user performs the accepting operation at this point, e.g., carries out an operation to select the accepting button B3, then the requesting user and the accepting user are associated with each other as friend users and also as real name disclosure users as discussed above. In this case, the received request information RR is deleted from the request list page 28. In the present embodiment, for example, establishing the association causes the friend management data stored in the storage part 10b of the user management server 10 to be updated from what is shown in FIG. 3 to what is indicated in FIG. 20. In FIG. 20, the friend user ID "bbb002" is added to the friend management data of which the user ID is "aaa001." Also in FIG. 20, the real name disclosure user ID "bbb002" is added to the friend management data of which the user ID is "aaa001." Further in FIG. 20, the friend user ID "aaa001" is added to the friend management data of which the user ID is "bbb002." Also in FIG. 20, the real name disclosure user ID "aaa001" is added to the friend management data of which the user ID is "bbb002."

As in the case of FIGS. 8 and 14, the accepting user may have display of the profile page 22 corresponding to the request information selected by performing operations to move the cursor C over the request list page 28 illustrated in FIG. 19. The accepting user is allowed to perform operations to accept the request corresponding to the received relation request or to delete the received or sent relation request through the profile page 22.

In the present embodiment, as described above, the requesting user need only request close friend registration to achieve two purposes: to be associated with the accepting user as a friend user and as a real name disclosure user, without performing two steps of operations to request close friend registration and to request real name disclosure. The present embodiment thus enables each user to register a real name disclosure user with less trouble than before.

For example, suppose that a user for whom the character string S2 representing the name indicated by the real name data is displayed can only be requested to be registered as a friend. In this case, even if the user is registered as a friend user, the friend information FIa about the user in the friend list page 30 does not include the character string S2 representing the name indicated by the real name data. That means it is difficult to identify the friend information FIa about the user of interest from the list of friend information FI in the friend list page 30. By contrast, the present embodiment allows the user for whom the character string S2 representing the name indicated by the real name data is displayed to be requested to be registered as a close friend. When the request is accepted, the friend list page 30 is arranged to have the friend information FIb including the character string S2 representing the name indicated by the real name data of the user. In this manner, in the present embodiment, it is easy to identify the friend information FIb about the user of interest from the list of the friend information FI in the friend list page 30.

It is to be noted that the screen transitions of the present embodiment are not limited to those described above. For example, in response to the operation to select the search result information RI in the search page 20, the friend request sending page 24 or the close friend request sending page 34 may be displayed. As another example, also in response to the operation to select the search result information RI in the search page 20, the relation request may be sent. In this case, the operation to select the search result information RI corresponds to the friend registration requesting operation or to the close friend registration requesting operation.

As a further example, the character string S2 representing the name indicated by the real name data may or may not be included in the profile page 22 displayed through the search result information RIb or the friend information FIb.

As a still further example, given the page through which the close friend registration requesting operation may be performed, both the friend registration requesting operation and the close friend registration requesting operation may be carried out.

Request and Acceptance Through Pages Other Than search Page or Friend List Page

It was explained above that the friend registration requesting operation and the close friend registration requesting operation are performed through the search page 20 and that the real name disclosure requesting operation is carried out through the friend list page 30. Alternatively, however, these operations may be performed through pages other than the above-described pages.

Figure 21:
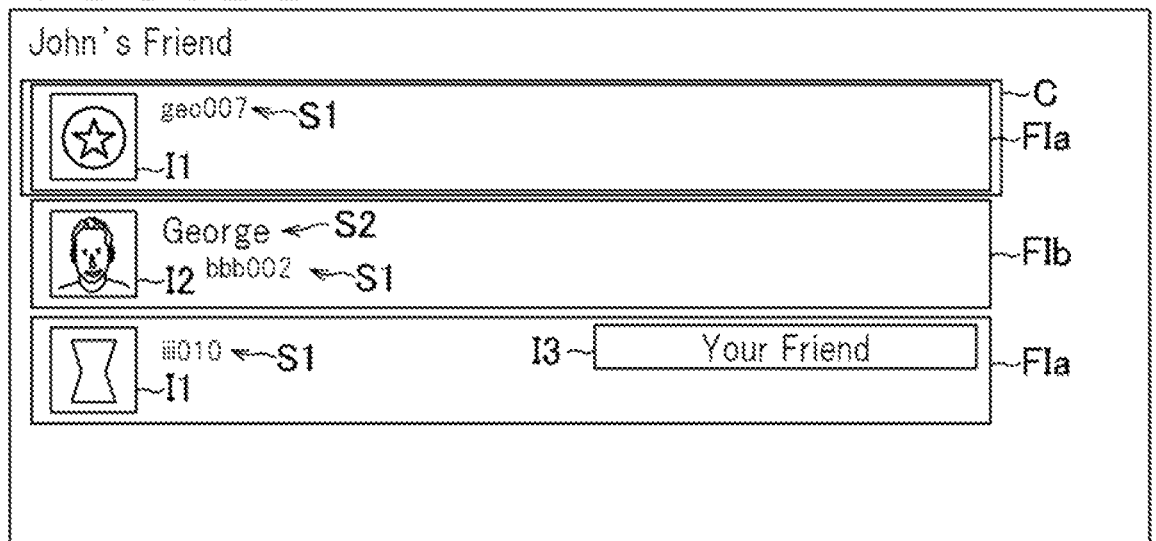
FIG. 21 is a schematic view showing a typical friend of friend (FoF) page.

FIG. 21 shows a typical FoF page 36 displayed on the display unit of the client 12 used by the requesting user having the user ID "aaa001." In the present embodiment, the FoF page 36 is a page that includes the friend information FI corresponding to specific friend users. The example in FIG. 21 is shown to include the friend information FI about the friend users of the user with the user ID "hhh009." This is how the friend information FI is listed in the FoF page 36.

In the present embodiment, the friend information FIb corresponding to a real name disclosure user of the requesting user includes the character string S1 representing the user ID of the user, the character string S2 representing the name indicated by the real name data of the user, and the photo image I2 of the user. The character strings S1 and S2 and the photo images I2 are also included in the friend information FIb corresponding to the users having "2" set as their real name disclosure page IDs in the user management data. Meanwhile, the friend information FIa corresponding to a user who is none of those mentioned above is arranged to include the character string S1 representing the user ID of the user and the icon image I1 of the user.

Of the items of the friend information FI listed in the FoF page 36, the friend information FI about each friend user of the requesting user includes an image I3 indicating that this is a friend user of the requesting user's.

The present embodiment allows the requesting user to select the friend information FI listed in the FoF page 36, as in the case of FIG. 10. If at this point a selection is made of the friend information FI including neither the character string S2 representing the name indicated by the real name data nor the image I3, the same profile page 22 as that in FIG. 5 is displayed. In the profile page 22, as in the case of FIG. 5, the friend request button B1 is included. If at this point the requesting user performs an operation to select the friend request button B1 and then proceeds with the same operations as described above, the requesting user and the accepting user are associated with each other as friend users.

On the other hand, if a selection is made of the friend information FIa that includes the character string S2 representing the name indicated by the real name data but excludes the image I3, then the same profile page 22 as that in FIG. 11 is displayed. In the profile page 22, as in the case of FIG. 11, the real name request button B4 is included. If at this point the requesting user performs an operation to select the real name request button B4 and then proceeds with the same operations as described above, the requesting user and the accepting user are associated with each other as friend users and as real name disclosure users as well.

Figure 22:
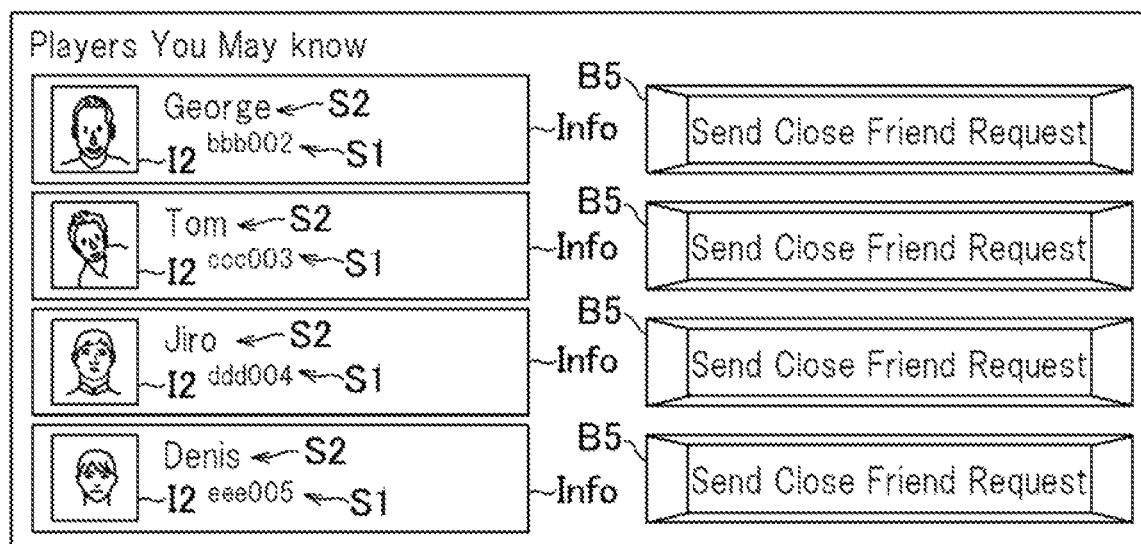
FIG. 22 is a schematic view showing a typical you may know (YMK) page.

FIG. 22 shows a typical YMK page 3B displayed on the display unit of the client 12 used by the requesting user having the user ID "aaa001." Designed with existing technology, the YMK page 39 of the present embodiment displays in list form information Info about the users identified as the users recommended registration as close friends to the requesting user. The example of FIG. 22 is shown to include the information Info about the friend users of the requesting user. In the present embodiment, the information Info listed in the YMK page 38 is limited to the information Info regarding the users having "3" set as their real name disclosure page IDs in the user management data. The information Info about each user includes the character string S1 representing the user ID of the user, the character string S2 representing the name indicated by the real name data of the user, and the photo image I2 of the user.

The YMK page 38 of the present embodiment includes the close friend request button B5 corresponding to the information Info. If at this point the requesting user performs an operation to select the close friend request button B5, the display unit of the client 12 used by the requesting user displays the close friend request sending page 34, the same as that in FIG. 17, about the user corresponding to the selected close friend request button B5. Thereafter, the same operations as described above are carried out to have the requesting user and the accepting user associated with each other as friend users and as real name disclosure users as well.

The information Info about a user not having "3" set as the real name disclosure page ID in the user management data may be included in the YMK page 38. In this case, the information Info about the user may include the character string S1 representing the user ID of the user and the icon image I1 of the user. The information Info may also be arranged to correspond to the friend request button B1. If the requesting user performs an operation to select the friend request button B1, the same friend request sending page 24 as that in FIG. 6 may be displayed regarding the user corresponding to the friend request button B1. Thereafter, the same operations as described above may be carried out to have the requesting user and the accepting user associated with each other as friend users. When an operation is performed to select a given user in the YMK page 38, the profile page 22 of the selected user may be displayed.

Figure 23:
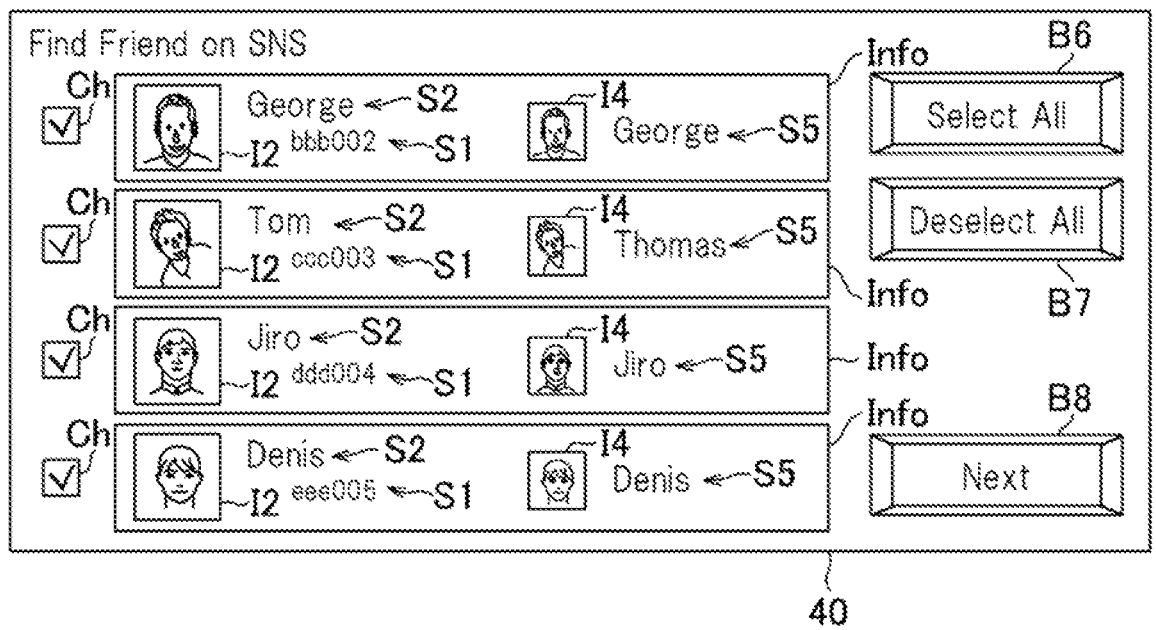
FIG. 23 is a schematic view showing a typical social networking service (SNS) friend finding page.

FIG. 23 shows a typical SNS friend finding page 40 displayed on the display unit of the client 12 used by the requesting user having the user ID "aaa001." The SNS friend finding page 40 of the present embodiment displays in list form the information Info about the users registered as friends on an external SNS. The information Info about these users includes the character strings S1 representing the user IDs of the users, the character strings S2 representing the names indicated by the real name data of the user, and the photo images I2 of the user. The information Info about these users further includes photo images I4 of the users and character strings S5 representing the identification information about the users on the external SNS.

Figure 24:
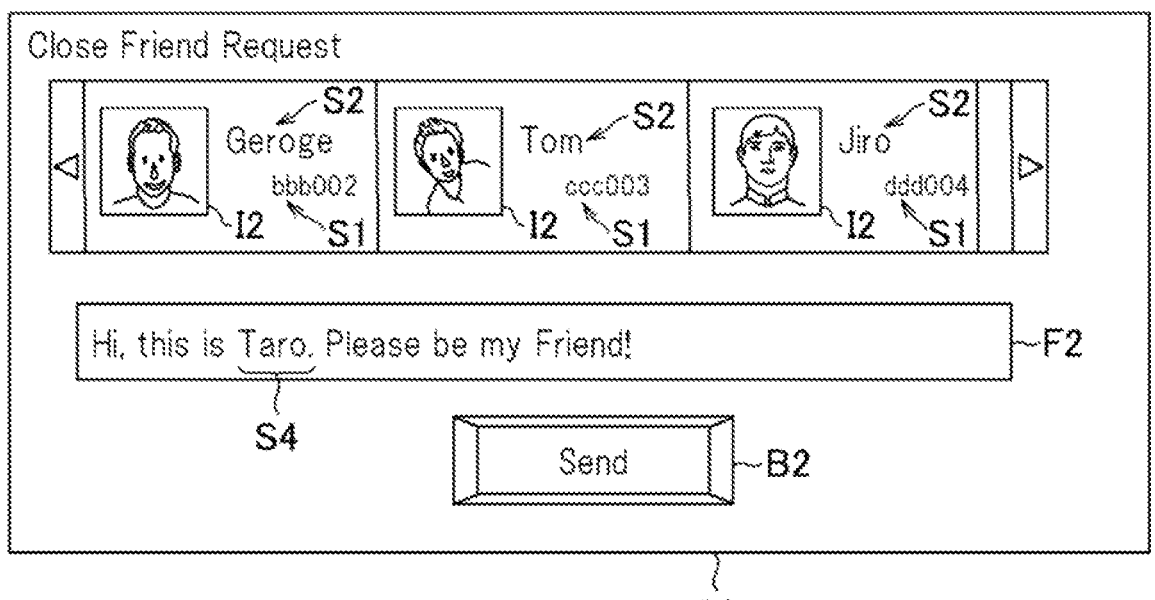
FIG. 24 is a schematic view showing another close friend request sending page.

In the SNS friend finding page 40, check boxes Ch permit selection of multiple items of the information Info. If the requesting user performs an operation to select a select-all button B6, all items of the information Info are selected. On the other hand, if the requesting user performs an operation to select a deselect-all button B7, then all items of the information Info are deselected. If at this point the requesting user performs an operation to select a screen transition button B8, a close friend request sending page 34 indicated in FIG. 24 is displayed on the display unit of the client 12 used by the requesting user. If at this point the requesting user performs an operation to select the sending button B2, a close friend request is sent to each of the users selected in the SNS friend finding page 40. In this case, a single close friend registration requesting operation need only be performed to request multiple users to be registered as close friends. In like manner, a single friend registration requesting operation may also be carried out to request multiple users to be registered as friends. Alternatively, a single real name disclosure requesting operation may also be carried out to request real name disclosure to multiple users.

Functions

The functions of the information processing system 1 of the present embodiment and the processing executed by the information processing system 1 are further explained below mainly in connection with the above-described request and acceptance.

Figure 25:
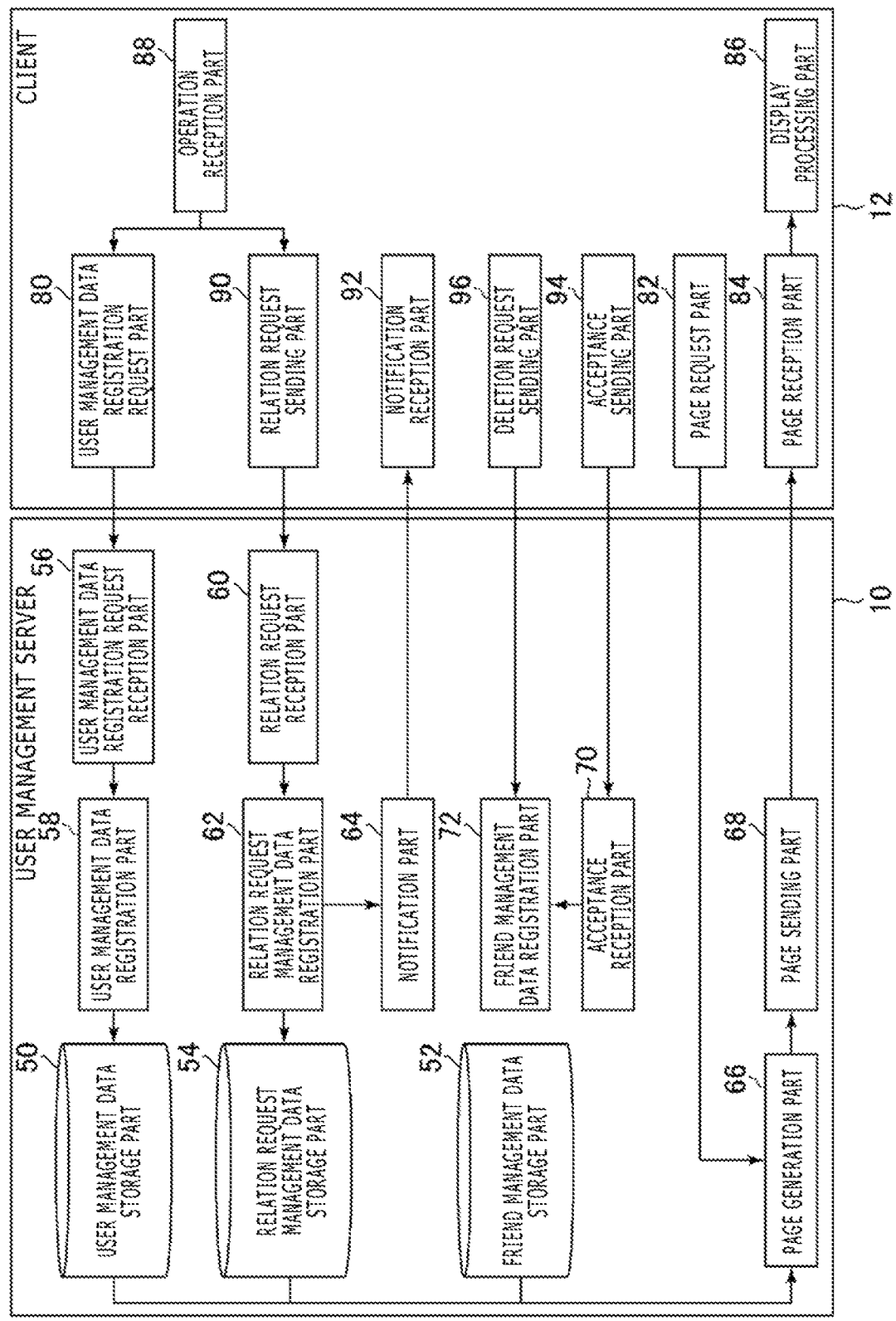
FIG. 25 is a functional block diagram showing typical functions implemented by the information processing system as one embodiment of the present invention.

FIG. 25 is a functional block diagram showing typical functions implemented by the information processing system 1 of the present embodiment. It is to be noted that not all functions shown in FIG. 25 need to be implemented by the information processing system 1 of the present embodiment and that functions other than those indicated in FIG. 25 may be implemented by the information processing system 1.

As shown in FIG. 25, the user management server 10 of the present embodiment is configured functionally to include, for example, a user management data storage part 50, a friend management data storage part 52, a relation request management data storage part 54, a user management data registration request reception part 56, a user management data registration part 58, a relation request reception part 60, a relation request management data registration part 62, a notification part 64, a page generation part 66, a page sending part 68, an acceptance reception part 70, and a friend management data registration part 72. The user management data storage part 50, the friend management data storage part 52, and the relation request management data storage part 54 are practiced mainly by use of the storage part 10b. The user management data registration request reception part 56, the relation request reception part 60, the notification part 64, the page sending part 68, and the acceptance reception part 70 are practiced mainly by use of the communication part 10c. The user management data registration part 58, the relation request management data registration part 62, the page generation part 66, and the friend management data registration part 72 are practiced mainly by use of the control part 10a.

The above-mentioned functions are implemented by the control part 10a executing a program which has been installed in the user management server 10 serving as a computer and which includes the commands corresponding to these functions. The program is stored on a computer-readable information storage medium such as an optical disk, a magnetic disk, a magnetic tape, a magneto-optical disk, or a flash memory, or transmitted typically via the Internet, when supplied to the user management server 10.

Also as shown in FIG. 25, the client 12 of the present embodiment is configured functionally to include, for example, a user management data registration request part 80, a page request part 82, a page reception part 84, a display processing part 86, an operation reception part 88, a relation request sending part 90, a notification reception part 92, an acceptance sending part 94, and a deletion request sending part 96. The user management data registration request part 80, the page request part 82, the page reception part 84, the relation request sending part 90, the notification reception part 92, the acceptance sending part 94, and the deletion request sending part 96 are practiced mainly by use of the communication part 12*c*. The display processing part 86 is practiced mainly by use of the control part 12*a* and the output part 12*d*. The operation reception part 88 is practiced mainly by use of the control part 12*a* and the input part 12*e*.

The above-mentioned functions are implemented by the control part 12*a* executing a program which has been installed in each client 12 serving as a computer and which includes the commands corresponding to these functions. The program is stored on a computer-readable information storage medium such as an optical disk, a magnetic disk, a magnetic tape, a magneto-optical disk, or a flash memory, or transmitted typically via the Internet, when supplied to each client 12.

The user management data storage part 50 of the present embodiment stores the user management data shown in FIG. 2, for example.

The friend management data storage part 52 of the present embodiment stores the friend management data shown in FIGS. 3, 9, and 15, for example.

The relation request management data storage part 54 of the present embodiment stores the relation request management data, shown typically in FIG. 26, for managing the relation requests sent from the client 12 used by the requesting user. As indicated in FIG. 26, the relation request management data includes source user IDs, destination user IDs, request type data, sent date and time data, and message data. The source user IDs are the user IDs of the requesting users using the clients 12 that sent relation requests. The destination user IDs are the user IDs of the accepting users using the clients 12 to which the relation requests were sent. The request type data indicates the type of each relation request. The types of the relation requests indicated by the request type data will be discussed later. The sent date and time data indicates the date and time at which each relation request was sent. The message data indicates each message input in the above-mentioned message input form F2. If the requesting user with the user ID "aaa001" requests the accepting user with the user ID "bbb002" to be registered as a close friend, the relation request management data in the top row in FIG. 26 and the relation request management data in the second row from the top may be stored. If the requesting user with the user ID "aaa001" requests the accepting user with the user ID "geo007" to be registered as a friend, the relation request management data in the bottom row in FIG. 26 may be stored.

The user management data registration request reception part 56 of the user management server 10 in the present embodiment may receive the request for registration of the user management data from the client 12. The user management data registration request reception part 56 of the present embodiment may receive requests to add, delete, or update the user management data.

The user management data registration part 58 of the user management server 10 in the present embodiment may register the user management data based on the registration request received by the user management data registration request reception part 56. The user management data registration part 58 of the present embodiment may add, delete, or update the user management data.

The relation request reception part 60 of the user management server 10 in the present embodiment may receive the relation request sent from the client 12 used by the requesting user.

The relation request management data registration part 62 of the user management server 10 in the present embodiment may register the relation request management data. The relation request management data registration part 62 of the present embodiment may add, delete, or update the relation request management data.

The notification part 64 of the user management server ID in the present embodiment may, upon receipt of the relation request, give a notification that the relation request addressed to the accepting user was sent. Typically, the notification part 64 of the present embodiment pushes the notification to the client 12 of the accepting user. The notification part 64 of the present embodiment may give the notification that the relation request was sent to the client 12 identified by the terminal ID included in the user management data of the accepting user. With the present embodiment, the accepting user may use multiple clients 12 as mentioned above. In this case, the notification that the relation request was sent is transmitted to the multiple clients 12.

The page generation part 66 of the user management server 10 in the present embodiment generates the data representing the various pages discussed above with reference to FIGS. 4 to 8, 10 to 14, 16 to 19, and 21 to 24, for example.

The page sending part 68 of the user management server 10 in the present embodiment may send the data generated by the page generation part 66 to the client 12.

In response to the acceptance by the accepting user of the request from the requesting user, the acceptance reception part 70 of the user management server 10 in the present embodiment may receive an acceptance notification sent from the client 12 used by the accepting user.

The friend management data registration part 72 of the user management server 10 in the present embodiment may register the friend management data. The friend management data registration part 72 of the present embodiment may add, delete, or update the friend management data.

In response to a first operation to designate a user, the friend management data registration part 72 of the present embodiment may register the designated user as a user in a first relation involving disclosure of a nickname. As a specific example, in response to the friend registration requesting operation performed by the requesting user to designate an accepting user, the designated accepting user is registered as a user in friend relation with the requesting user.

Also, in response to a second operation to designate a first-relation user, the friend management data registration part 72 of the present embodiment may register the designated first-relation user as a user in a second relation involving disclosure of the real name as well. As a specific example, in response to the real name disclosure requesting operation to designate as the accepting user a user in friend relation with the requesting user, the accepting user is registered as a user in the relation involving disclosure of the real name of the requesting user.

Also, in response to a third operation to designate a user who has yet to be registered as a user in the first relation, the friend management data registration part 72 of the present embodiment may register the designated user as a user who is in the first and the second relations. As a specific example, in response to the close friend registration requesting operation to designate an accepting user yet to be registered as a user in friend relation with the requesting user, the accepting user is registered as a user who is in friend relation with the requesting user and who is also in the relation involving disclosure of the real name.

Also, in response to an operation to designate a user whose real name is displayed in the search page 20 for example, the friend management data registration part 72 may register the designated user as a user in the first and the second relations as described above. Furthermore, in response to an operation to designate a user whose real name is not displayed in a list of information typically in the search page 20 regarding candidate users for the first relation, the friend management data registration part 72 may register the designated user as a user in the first relation. Also, in response to an operation to designate a user whose real name is displayed in the list, the friend management data registration part 72 may register the designated user as a user in the first and the second relations.

The user management data registration request part 80 of the client 12 sends a user management data registration request to the user management server 10. The user management data registration request part 80 of the present embodiment sends to the user management server 10 the request to add, delete, or update the user management data. In response to the registration request sent by the user management data registration request part 80, the present embodiment permits registration of the user management data. It is to be noted that in response to the request to add new user management data, the present embodiment permits generation of the new user management data as well as generation of new friend management data including the user ID of the new user management data.

The page request part 82 of the client 12 sends to the user management server 10 the request to send the above-described various pages. The page generation part 66 of the user management server 10 in turn generates the page requested by the sending request.

The page reception part 84 of the client 12 receives the data representing the page sent from the page sending part 68 of the user management server 10.

The display processing part 86 of the client 12 generates the page based on the page data received by the page reception part 84, and causes the display unit to display the generated page. Also, the display processing part 86 of the present embodiment may display in list form the information about the users in the first relation, the list including the real names of the users registered to be in the second relation. As a specific example, the display processing part 86 displays the friend list page 30 shown in FIG. 10 as a list of users in friend relation, the list including the real names of the users registered to be in the relation involving disclosure of the real name.

The operation reception part 88 of the client 12 receives various operations performed by the user on the client 12. The operations received by the operation reception part 88 of the present embodiment may include the above-described friend registration requesting operation, real name disclosure requesting operation, close friend registration requesting operation, accepting operation, and relation request deleting operation.

The relation request sending part 90 of the client 12 sends to the user management server 10 the relation request corresponding to the operation received by the operation reception part 88.

The notification reception part 92 of the client 12 receives the notification sent from the notification part 64 of the user management server 10.

When the operation reception part 88 receives an accepting operation, the acceptance sending part 94 of the client 12 sends to the user management server 10 an acceptance notification corresponding to the received accepting operation.

When the operation reception part 88 receives an operation to delete a relation request, the deletion request sending part 96 of the client 12 sends to the user management server 10 a request to delete the relation request. Upon receipt of the deletion request, the relation request management data registration part 62 of the user management server 10 deletes from the relation request management data storage part 54 the relation request management data targeted by the deletion request.

Processing Flow

Figure 27:
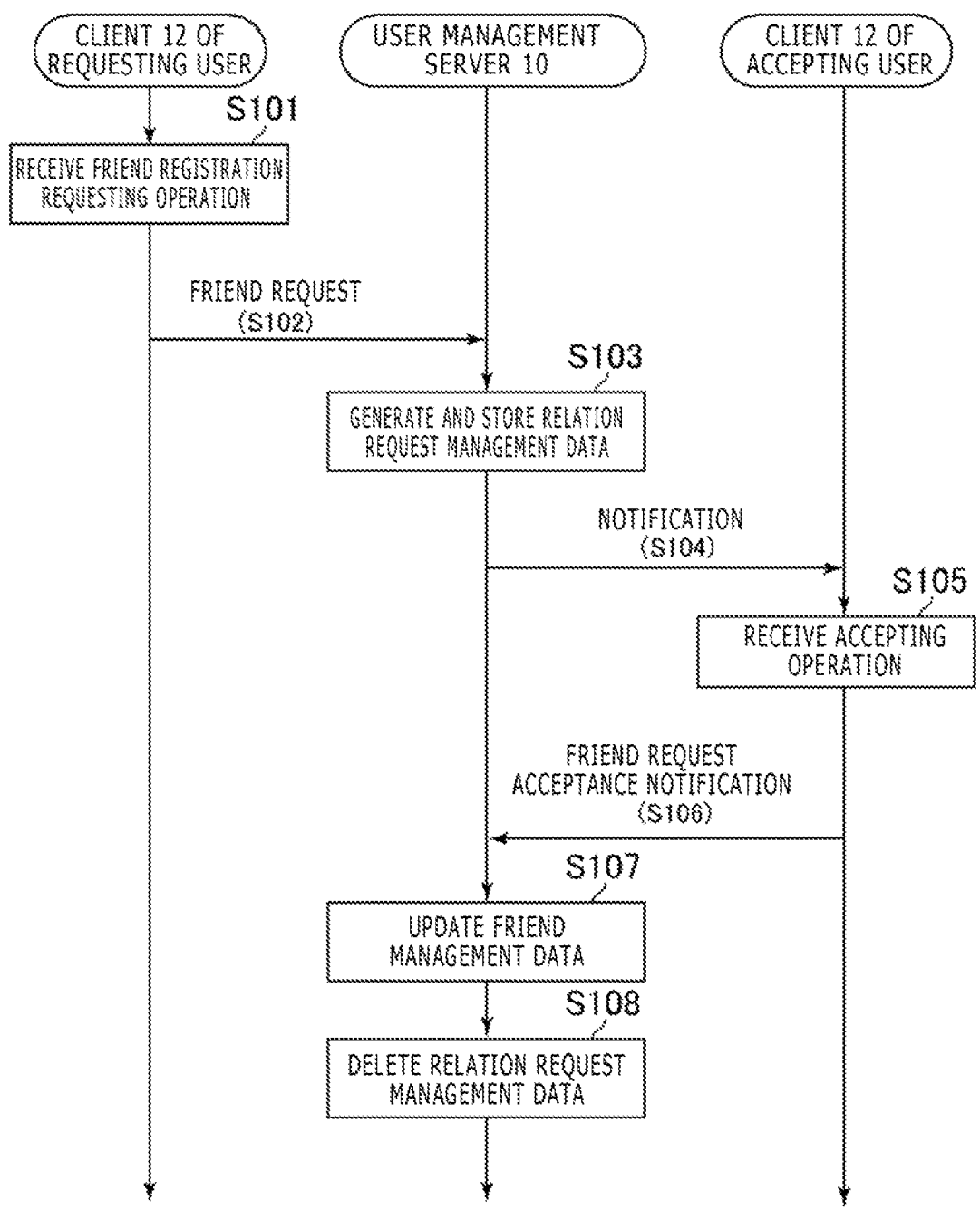
FIG. 27 is a flowchart showing a typical flow of processing performed by the information processing system as the present embodiment.

Explained below with reference to the flowchart of FIG. 27 is a typical flow of processing performed by the information processing system 1 of the present embodiment in order to register the requesting user and the accepting user as friends with each other.

First, the requesting user performs a friend registration requesting operation to designate an accepting user. The operation reception part 88 of the client 12 used by the requesting user receives the friend registration requesting operation (S101). In turn, the relation request sending part 90 of the client 12 used by the requesting user sends a friend request addressed to the accepting user to the user management server 10. The relation request reception part 60 of the user management server 10 then receives the friend request (S102).

The friend request is implemented by the present embodiment as a relation request associated with the request type data having the value "Friend Request," for example. The relation request of the present embodiment is also associated with the source user ID and the destination user ID. In this example, the user ID of the requesting user is associated as the source user ID, and the user ID of the accepting user is associated as the destination user ID. The relation request is also associated with the value representing the sent date and time of the relation request and the message input in the message input form F2 in the above-described friend request sending page 24.

In turn, the relation request management data registration part 62 of the user management server 10 generates the relation request management data corresponding to the friend request received in the processing of S102, and stores the generated data into the relation request management data storage part 54 (S103). The source user ID associated with the friend request received in the processing of S102 is set as the source user ID in the relation request management data generated at this point. Also, the destination user ID associated with the friend request received in the processing of S102 is set as the destination user ID in the generated relation request management data. Further, the value of the request type data associated with the friend request received in the processing of S102 is set as the value of the request type data in the generated relation request management data. In this example, the value "Friend Request" is set as the value of the request type data in the generated relation request management data. Also, the value representing the sent date and time associated with the friend request received in the processing of S102 is set as the value of the sent date and time in the generated relation request management data. Furthermore, the message associated with the friend request received in the processing of S102 is set as the value of the message data in the generated relation request management data.

Then the notification part 64 of the user management server 10 notifies the client 12 identified by the terminal TD included in the user management data of the accepting user that a relation request addressed to the accepting user has been sent. In turn, the notification reception part 92 of the client 12 receives the notification (S104).

Thereafter, the accepting user performs an operation to accept the friend request. Then the operation reception part 88 of the client 12 used by the accepting user receives the accepting operation (S105). In turn, the acceptance sending part 94 of the client 12 used by the accepting user sends an acceptance notification regarding the friend request to the user management server 10. The acceptance reception part 70 of the user management server 10 then receives the acceptance notification (S106). In the present embodiment, the acceptance notification is associated with the source user ID, the destination user ID, and the request type data value, all associated with the friend request targeted by the accepting operation.

The friend management data registration part 72 of the user management server 10 then updates the friend management data based on the friend request received in the processing of S102 (S107). In the processing of S107, the friend management data registration part 72 may identify the friend management data including as the user ID the source user ID associated with the acceptance notification. The friend management data registration part 72 then adds the destination user ID associated with the acceptance notification as the friend user ID in the identified friend management data. The friend management data registration part 72 further identifies the friend management data including as the user ID the destination user ID associated with the acceptance notification. Also, the friend management data registration part 72 adds the source user ID associated with the acceptance notification as the friend user ID in the identified friend management data.

The relation request management data registration part 62 of the user management server 10 then deletes from the relation request management data storage part 54 the relation request management data associated with the friend request received in the processing of S102 (S108). This completes the processing of this example.

In the manner described above, the requesting user and the accepting user are registered as friends with each other.

Figure 28:
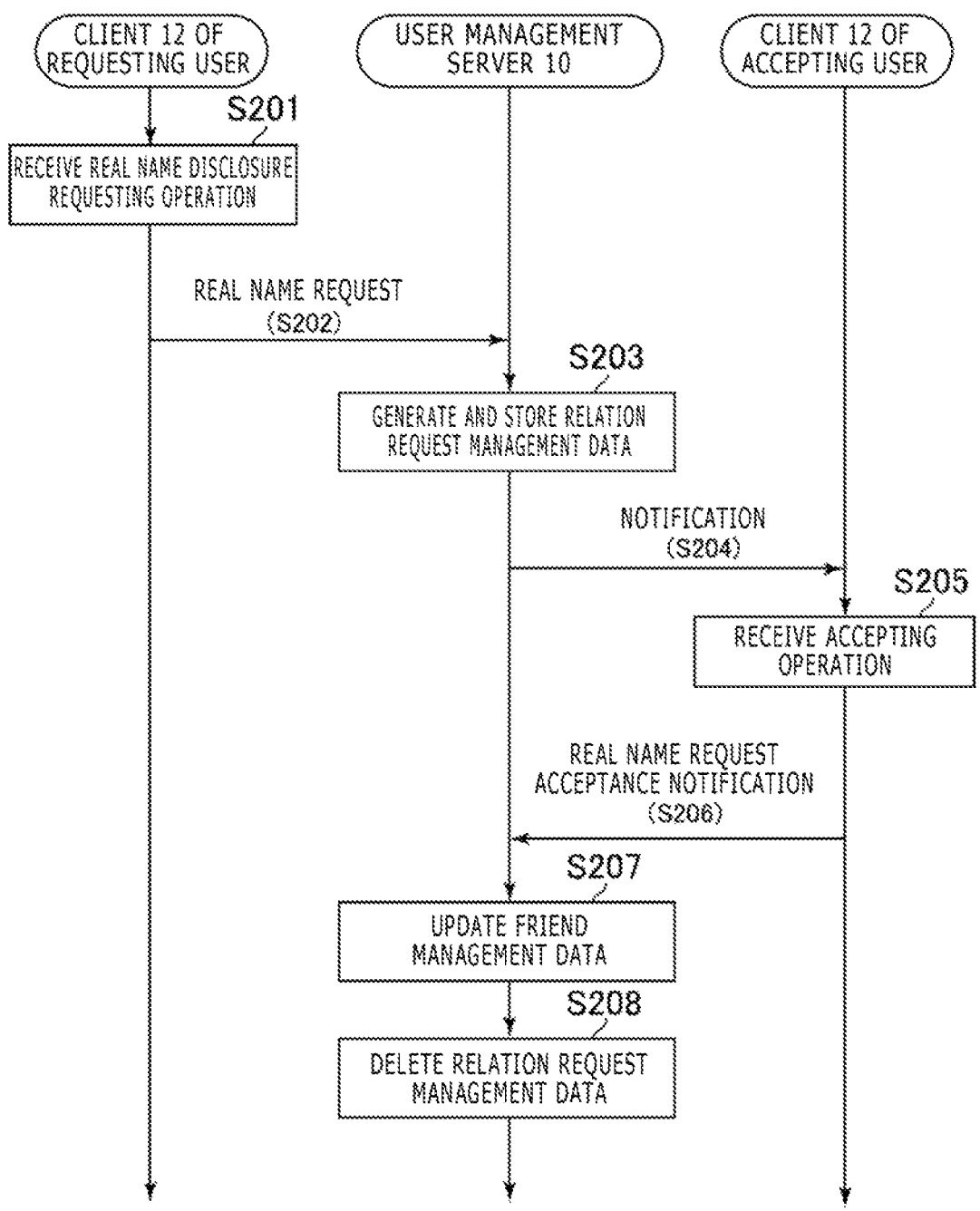
FIG. 28 is a flowchart showing another typical flow of the processing performed by the information processing system as the present embodiment.

Explained below with reference to the flowchart of FIG. 28 is a typical flow of processing performed by the information processing system 1 of the present embodiment in order to allow the requesting user and the accepting user registered as friends with each other to disclose their real names to each other.

First, the requesting user performs a real name disclosure requesting operation to designate an accepting user. The operation reception part 88 of the client 12 used by the requesting user receives the real name disclosure requesting operation (S201). In turn, the relation request sending part 90 of the client 12 used by the requesting user sends a real name request addressed to the accepting user to the user management server 10. The relation request reception part 60 of the user management server 10 receives the real name request (S202).

The real name request is implemented by the present embodiment as a relation request associated with the request type data having the value "Real Name Bequest," for example. Also, the relation request of the present embodiment is associated with the source user ID and the destination user ID. In this example, the user ID of the requesting user is associated as the source user ID, and the user ID of the accepting user is associated as the destination user ID. Also associated with the relation request are the value representing the sent date and time of the relation request and the message input in the message input form F2 in the above-described real name request sending page 32.

The relation request management data registration part 62 of the user management server 10 then generates the relation request management data corresponding to the real name request received in the processing of S202, and stores the generated data into the relation request management data storage part 54 (S203). The source user ID associated with the real name request received in the processing of S202 is set as the source user ID in the relation request management data generated at this point. Also, the destination user ID associated with the real name request received in the processing of S202 is set as the destination user ID in the generated relation request management data. Further, the value of the request type data associated with the real name request received in the processing of S202 is set as the value of the request type data in the generated relation request management data. In this example, the value "Real Name Request" is set as the value of the request type data in the generated relation request management data. Also, the value representing the sent date and time associated with the real name request received in the processing of S202 is set as the value of the sent date and time in the generated relation request management data. Furthermore, the message associated with the friend request received in the processing of S202 is set as the value of the message data in the generated relation request management data.

Then the notification part 64 of the user management server 10 notifies the client 12 identified by the terminal ID included in the user management data of the accepting user that a relation request addressed to the accepting user has been sent. In turn, the notification reception part 92 of the client 12 receives the notification (S204).

Thereafter, the accepting user performs an operation to accept the real name request. Then the operation reception part 88 of the client 12 used by the accepting user receives the accepting operation (S205). In turn, the acceptance sending part 94 of the client 12 used by the accepting user sends an acceptance notification regarding the real name request to the user management server 10. The acceptance reception part 70 of the user management server 10 then receives the acceptance notification (S206). In the present embodiment, the acceptance notification is associated with the source user ID, the destination user ID, and the request type data value, all associated with the real name request targeted by the accepting operation.

The friend management data registration part 72 of the user management server 10 then updates the friend management data based on the real name request received in the processing of S202 (S207). In the processing of S207, the friend management data registration part 72 may identify the friend management data including as the user ID the source user ID associated with the acceptance notification. The friend management data registration part 72 then adds the destination user ID associated with the acceptance notification as the real name disclosure user ID in the identified friend management data. The friend management data registration part 72 further identifies the friend management data including as the user ID the destination user ID associated with the acceptance notification. Also, the friend management data registration part 72 adds the source user ID associated with the acceptance notification as the real name disclosure user ID in the identified friend management data.

The relation request management data registration part 62 of the user management server 10 then deletes from the relation request management data storage part S4 the relation request management data associated with the real name request received in the processing of S202 (S208). This completes the processing of this example.

In the manner described above, the requesting user and the accepting user registered as friends with each other disclose their real names to each other.

The page generation part 66 of the present embodiment may generate the request list page 28 based on the relation request management data stored in the relation request management data storage part 54. At this point, the page generation part 66 may generate the sent request information SR based on the relation request management data including the user ID of the accepting user as the source user ID. Also, the page generation part 66 may generate the received request information RR based on the relation request management data including the user ID of the accepting user as the destination user ID.

Further, the page generation part 66 associates the accepting button B3 corresponding to the received request information RR with the source user ID, the destination user ID, and the request type data value included in the relation request management data corresponding to the received request information RR.

That means the acceptance sending part 94 is enabled to send the source user ID, the destination user ID, and the request type data value associated with the accepting button B3 selected by the accepting user to the user management server 10 in association with the acceptance notification.

Figure 29:
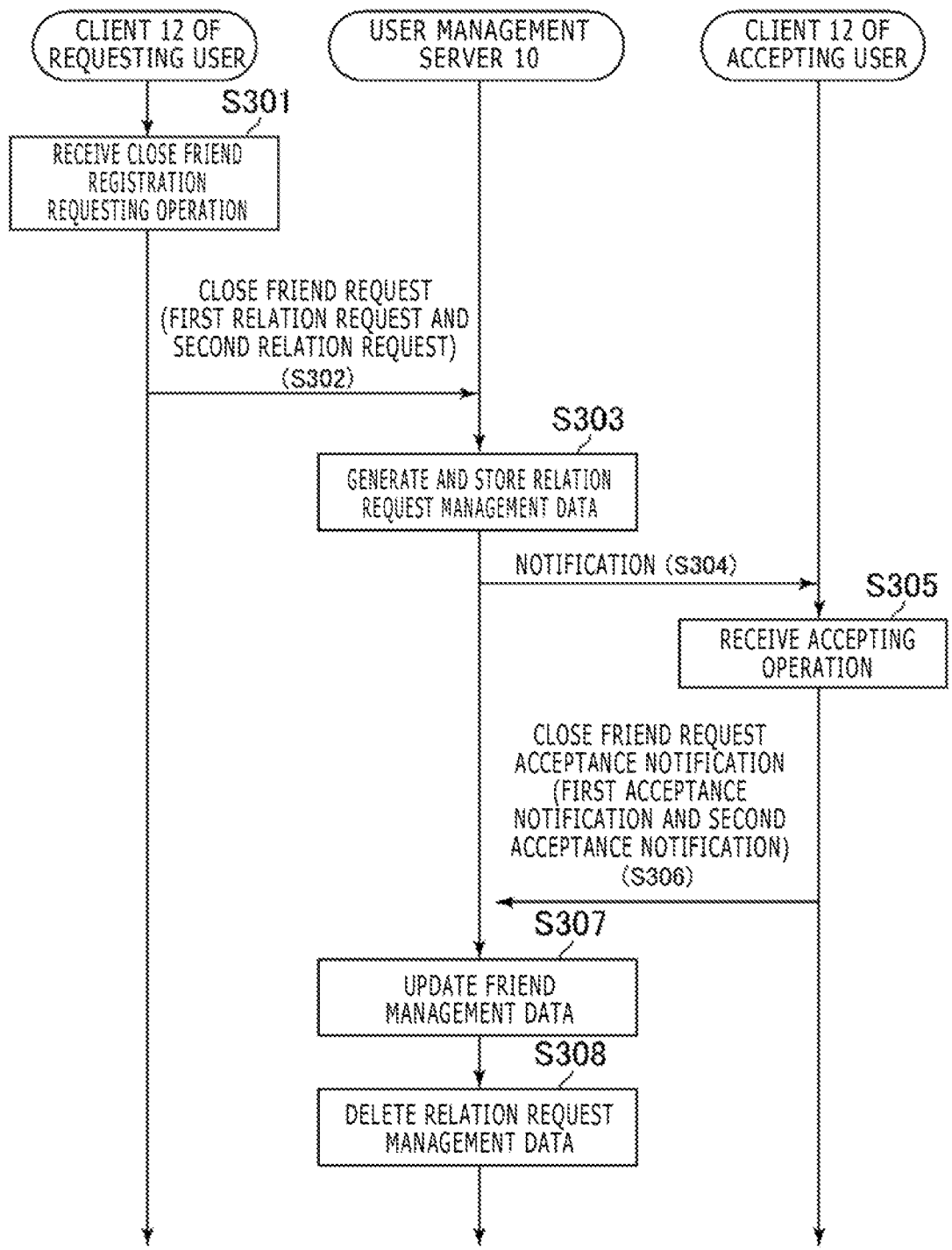
FIG. 29 is a flowchart showing another typical flow of the processing performed by the information processing system as the present embodiment.

Explained below with reference to the flowchart of FIG. 29 is a typical flow of processing performed by the information processing system 1 of the present embodiment in order to register the requesting user and the accepting user as close friends with each other.

First, the requesting user performs a close friend registration requesting operation to designate an accepting user. Then the operation reception part 88 of the client 12 used by the requesting user receives the close friend registration requesting operation (S301). In turn, the relation request sending part 90 of the client 12 used by the requesting user sends a close friend request addressed to the accepting user to the user management server 10. The relation request reception part 60 of the user management server 10 then receives the close friend request (S302).

The close friend request is typically implemented by the present embodiment as two relation requests. A first relation request is implemented as a relation request associated with the request type data having the value "Friend Request," for example. A second relation request is implemented as a relation request associated with the request type data having the value "Real Name Request," for example. The first and the second relation requests may both be associated with the source user ID and the destination user ID. In this example, the user ID of the requesting user is associated as the source user ID, and the user ID of the accepting user is associated as the destination user ID. Also associated with the first relation request are the value representing the sent date and time of the relation request and the message input in the message input form F2 in the above-described close friend request sending page 34. The value representing the sent date and time and the message may also be associated with the second relation request.

The relation request management data registration part 62 of the user management server 10 then generates the relation request management data corresponding to the friend request received in the processing of S302, and stores the generated data into the relation request management data storage part 54 (S303). Generated at this point is the relation request management data corresponding to each of the two relation requests. The source user ID associated with the first relation request received in the processing of S302 is set as the source user ID in the generated first relation request management data. The destination user ID associated with the first relation request received in the processing of S302 is set as the destination user ID in the generated first relation request management data. The value of the request type data associated with the first relation request received in the processing of S302 is set as the value of the request type data in the generated first relation request management data. In this example, the value "Friend Request" is set as the value of the request type data in the generated first relation request management data. Also, the value representing the sent date and time associated with the first relation request received in the processing of S302 is set as the value of the sent date and time in the generated first relation request management data. Furthermore, the message associated with the first relation request received in the processing of S302 is set as the value of the message data in the generated relation request management data.

Furthermore, the source user ID associated with the second relation request received in the processing of S302 is set as the source user ID in the generated second relation request management data. The destination user ID associated with the second relation request received in the processing of S302 is set as the destination user ID in the generated second relation request management data. The value of the request type data associated with the second relation request received in the processing of S302 is set as the value of the request type data in the generated second relation request management data. In this example, the value "Real Name Request" is set as the value of the request type data in the generated second relation request management data. The value representing the sent date and time associated with the second relation request received in the processing of S302 may be set as the value of the sent date and time in the generated second relation request management data. Further, the message associated with the second relation request received in the processing of S302 may be set as the value of the message data in the generated relation request management data.

Shown in the top row and in the second row from the top in FIG. 26 are two items of typical relation request management data generated on the basis of the close friend request being sent. For example, these two items of relation request management data are generated on the basis of the sent close friend request in which the user ID of the requesting user is "aaa001" and the user ID of the accepting user is "bbb002."

The notification part 64 of the user management server 10 then notifies the client 12 identified by the terminal ID included in the user management data of the accepting user that a relation request addressed to the accepting user has been sent. The notification reception part 92 of the client 12 then receives the notification (S304).

Thereafter, the accepting user performs an operation to accept the close friend request. Then the operation reception part 88 of the client 12 used by the accepting user receives the accepting operation (S305). The acceptance sending part 94 of the client 12 used by the accepting user then sends an acceptance notification regarding the close friend request to the user management server 10. The acceptance reception part 70 of the user management server 10 then receives the acceptance notification (S306). In the present embodiment, the acceptance notification regarding the close friend request is implemented by two acceptance notifications. A first acceptance notification may be associated with the source user ID, the destination user ID, and the request type data value "Friend Request" associated with the close friend request targeted by the accepting operation. A second acceptance notification may be associated with the source user ID, the destination user ID, and the request type data value "Real Name Request" associated with the close friend request targeted by the accepting operation.

The friend management data registration part 72 of the user management server 10 then updates the friend management data based on the close friend request received in the processing of S302 (S307).

In the processing of S307, upon receipt of the first acceptance notification, the friend management data registration part 72 may identify the friend management data including as the user ID the source user ID associated with the first acceptance notification. The friend management data registration part 72 adds the destination user ID associated with the first acceptance notification as the friend user ID in the identified friend management data. The friend management data registration part 72 further identifies the friend management data including as the user ID the destination user ID associated with the first acceptance notification. The friend management data registration part 72 adds the source user ID associated with the first acceptance notification as the friend user ID in the identified friend management data.

Also, upon receipt of the second acceptance notification, the friend management data registration part 72 may identify the friend management data including as the user ID the source user ID associated with the second acceptance notification. The friend management data registration part 72 adds the destination user ID associated with the second acceptance notification as the real name disclosure user ID in the identified friend management data. The friend management data registration part 72 further identifies the destination user ID associated with the second acceptance notification. The friend management data registration part 72 adds the source user ID associated with the second acceptance notification as the real name disclosure user ID in the friend management data including the identified destination user ID as the user ID.

The relation request management data registration part 62 of the user management server 10 then deletes from the relation request management data storage part 54 the relation request management data corresponding to the close friend request received in the processing of S302 (S308). This completes the processing of this example. In the processing of S308, the present embodiment may cause two items of relation request management data to be deleted.

In the manner described above, the requesting user and the accepting user are registered as close friends with each other.

The two relation requests sent from the client 12 in the above-described processing of S302 may be implemented either in a single packet or in two packets. If two packets are used to implement the two relation requests, every time one of the packets is received, the relation request management data corresponding to the received packet may be generated and stored in the above-described processing of S303.

The way the close friend request is implemented is not limited to what was discussed above. For example, the close friend request may be implemented as a single relation request associated with the request type data having the value "Close Friend Request." In this case, the single relation request is sent in the above-described processing of S302.

Also, the relation request management data in which "Close Friend Request" is set as the request type data value as shown in FIG. 30 may be generated in the above-described processing of S303. In this case, if the requesting user with the user ID "aaa001" requests the accepting user with the user ID "bbb002" to be registered as a close friend, the relation request management data shown in the top row in FIG. 30 may be stored.

As another example, instead of the two acceptance notifications sent from the client 12 in the above-described processing of S306, the client 12 may send a single acceptance notification associated with the request type data having the value "Close Friend Request."

In the present embodiment, in response to a predetermined operation performed by the accepting user, the page request part 82 of the client 12 used by the accepting user may send to the user management server 10 the request to send the request list page 28. Given the sending request, the page generation part 66 of the user management server 10 may generate the data representing the request list page 28 to be displayed on the display unit of the client 12 used by the accepting user.

In this example, the page generation part 66 may generate the request list page 28 to be displayed on the display unit of the client 12 used by the accepting user on the basis of the relation request management data shown in FIG. 26 and stored in the relation request management data storage part 54. The request list page 28 may include the sent request information SR corresponding to the relation request management data including the user ID of the accepting user as the source user ID. The request list page 28 may also include the received request information RR corresponding to the relation request management data including the user ID of the accepting user as the destination user ID.

Suppose now that two items of relation request management data are stored each having the same combination of the source user ID and the destination user ID, and that one of the items has the request type data value "Friend Request" and the other item has the request type data value "Real Name Request." In this case, as shown in FIG. 19, the request list page 28 may include a single item of the received request information RR corresponding to the two items of relation request management data. The character string S3 indicating "Close Friend Request" may also be included to represent the relation request type in the request list page 28.

The client 12 may not have the function of accepting a close friend request. In this case, even when the above-mentioned two items of relation request management data are stored, the request list page 28 may be arranged to include the received request information RR corresponding to the relation request management data in which the request type data value is "Friend Request." When an accepting operation is performed to select the accepting button B3 corresponding to the received request information RB, the same processing as in S105 to S108 discussed above may be carried out.

Thereafter, the client 12 may be notified that a relation request addressed to the accepting user has been sent. The request list page 28 may then be arranged to include the received request information RR corresponding to the relation request management data in which the request type data value is "Real Name Request." When an accepting operation is performed to select the accepting button B3 corresponding to the received request information RR, the same processing as in S205 to S208 discussed above may be carried out.

The client 12 without the function of accepting a real name request does not need to be notified that a relation request addressed to the accepting user has been sent following execution of the above-described processing of S105 to S108. Also, the request list page 28 does not need to include the received request information RR corresponding to the relation request management data in which the request type data value is "Real Name Request."

If the value "Close Friend Request" is arranged to be set as the request type data value included in the relation request management data, a smaller amount of storage need only be used than when two items of relation request management data are stored corresponding to the close friend registration requesting operation. If the close friend request is implemented as a single relation request associated with the request type data having the value "Close Friend Request," a smaller amount of communication need only be used than when the close friend request is implemented as two relation requests.

On the other hand, where two items of relation request management data are stored in response to the close friend registration requesting operation, data consistency is maintained even if there is configured the above-mentioned client 12 without the function of accepting a close friend request or a real name request. If two items of relation request management data are stored in response to the close friend registration requesting operation, the number of values that may be assumed by the request type data can be reduced because the value "Close Friend Request" is not set as the request type data value.

With the present embodiment, in response to a predetermined operation performed by the requesting user, the page request part 82 of the client 12 used by the requesting user may send to the user management server 10 a request to send the friend list page 30 of the requesting user. Given the sending request, the page generation part 66 of the user management server 10 may generate the data representing the friend list page 30 to be displayed on the display unit of the client 12 used by the requesting user. Explained below with reference to the flowchart in FIG. 31 is a typical flow of processing performed by the user management server 10 of the present embodiment in order to generate the data representing the friend list page 30.

First, the page generation part 66 identifies the friend management data including the user ID of the requesting user (S401). From among the user IDs set as the friend user IDs in the friend management data identified in the processing of S401, the page generation part 66 identifies one user ID on which the processing of S403 to S405, to be described below, has yet to be performed (S402).

The page generation part 66 determines whether or not the user ID identified in the processing of S402 is set as a real name disclosure user ID in the friend management data identified in the processing of S401 (S403). If it is determined that the identified user ID is set as a real name disclosure user ID (S403: Y), the page generation part 66 determines that the friend information FIb is to be generated for the user (S404). In the processing of S404, it may be determined that the character string S1 representing the user ID of the user, the character string S2 representing the name indicated by the real name data of the user, and the photo image I2 of the user are to be included in the friend information FIb.

On the other hand, if it is determined in the processing of S403 that the identified user ID is not set as a real name disclosure user ID (S403: N), the page generation part 66 determines that the friend information FIa is to be generated for the user (S405). In the processing of S405, it may be determined that the character string S1 representing the user ID of the user and the icon image I1 of the user are to be included in the friend information FIa.

The page generation part 66 then determines whether or not there exists any user ID on which the processing of S403 to S405 has yet to be performed among the user IDs set as the friend user IDs in the friend management data identified in the processing of S401 (S406). If it is determined that there exists one such user ID (S406: Y), the page generation part 66 again performs the processing of S402 and subsequent processing.

On the other hand, if it is determined that there is no such user ID (S406: N), the page generation part 66 generates the data representing the friend list page 30 including the friend information FIa and the friend information FIb in accordance with the determination in the preceding processing (S407). This completes the processing of this example.

The page sending part 68 sends the data representing the friend list page 30 thus generated to the client 12 of the requesting user. The page reception part 84 of the client 12 of the requesting user then receives the generated data. The display processing part 86 of the client 12 of the requesting user causes the display unit to display the page represented by the data.

Variations

The present invention is not limited to the present embodiment described above.

For example, a close friend ID may be set in the friend management data apart from the friend user IDs and the real name disclosure user IDs. If the user requested to be registered as a friend accepts the request, the user ID of the accepting user may be registered as a close friend ID in the friend management data of the requesting user. The user ID of the requesting user may also be registered as a close friend ID in the friend management data of the accepting user. This makes it possible to manage the users registered as real name disclosure users following the registration as friends in a manner distinct from the users registered as close friends.

As another example, other items of personal information such as addresses, dates of birth, and ages may be set in the user management data. The user IDs of the users who correspond to such items of personal information and who disclose their personal information to each other may also be set in the friend management data. If an operation is performed by the requesting user to request the disclosure of specific personal information from the accepting user and if the accepting user accepts the request, then the requesting user and the accepting user may disclose their personal information of interest to each other.

A degree of secrecy may be set for each item of personal information set in the user management data. The user IDs corresponding to a range of degrees of secrecy set for mutually disclosed personal information may be set in the friend management data. If an operation is performed by the requesting user to request from the accepting user the disclosure of personal information having a degree of secrecy lower than a predetermined degree and if the accepting user accepts the request, the requesting user and the accepting user may disclose to each other their personal information having the degree of secrecy lower than the predetermined degree.

The roles shared by the user management server 10 and by each client 12 are not limited to those discussed above. The user management server 10 and the clients 12 may each be configured using multiple housings.

The specific character strings in the foregoing description and in the accompanying drawings are only examples and are not limitative of the present invention.

The invention claimed is:

1. A user management server comprising:
a first display control part configured to display a first list of users in a social network on a display of a terminal of a first user, the first list including a nickname of a second user and a real name of a third user but not including a real name of the second user;
a first registration part configured such that in response to a first operation, which is executed when the first list is displayed, inputted to the terminal by the first user to designate the second user, the first registration part registers the second user as a user in a first relation with the first user, the first relation involving disclosure of a nickname;
a second display control part configured to display a second list of users already registered as users in the first relation with the first user, which is different from the first list, on the display of the terminal of the first user, the second list including the nickname of the second user but not including the real name of the second user and being displayed after the second user is registered as the user in the first relation with the first user;
a second registration part configured such that in response to a second operation, which is executed when the second list is displayed, inputted to the terminal by the first user to designate the second user, who is already registered as a user in the first relation with the first user, the second registration part registers the second user as a user in a second relation with the first user, the second relation involving disclosure of a real name as well; and
a third registration part configured such that in response to a third operation, which is executed when the first list is displayed, inputted to the terminal which is different from both of the first operation and the second operation by the first user to designate a third user, who is not registered as a user in the first relation with the first user, the third registration part registers the third user as a user in the first and the second relations with the first user, and
wherein a real name of the first user is not disclosed to a user who is in the first relation but who is not in the second relation with the first user.

2. A terminal comprising:
a display;
a first display processing part configured to display a first list of users in a social network on the display, the first list including a nickname of a second user and a real name of a third user but not including a real name of the second user;
a first reception part configured to receive a first operation, which is executed when the first list is displayed, by a first user to designate the second user, as a user in a first relation with the first user, the first relation involving disclosure of a nickname;
a second display processing part configured to display a second list of users already registered as users in the first relation with the first user, which is different from the first list, on the display, the second list including the nickname of the second user but not including the real name of the second user and being displayed after the second user is registered as the user in the first relation with the first user;
a second reception part configured to receive a second operation, which is executed when the second list is displayed, by the first user to designate the second user, who is already designated by the first operation, as a user in a second relation with the first user, the second relation involving disclosure of a real name as well;
a third reception part configured to receive a third operation, which is executed when the first list is displayed, which is different from both of the first operation and the second operation by the first user to designate a third user, who is yet to be designated by the first operation, as a user in the first and the second relations with the first user, and
wherein a real name of the first user is not disclosed to a user who is in the first relation but who is not in the second relation with the first user.

3. An information display system comprising:
a terminal including a display;
a first display processing part configured to display a first list of users in a social network on the display, the first list including a nickname of a second user and a real name of a third user but not including a real name of the second user;
a first registration part configured such that in response to a first operation, which is executed when the first list is displayed, inputted to the terminal by a first user to designate the second user, the first registration part registers the second user as a user in a first relation with the first user, the first relation involving disclosure of a nickname;
a second display processing part configured to display a second list of users already registered as users in the first relation with the first user, which is different from the first list, on the display, the second list including the nickname of the second user but not including the real name of the second user and being displayed after the second user is registered as the user in the first relation with the first user;
a second registration part configured such that in response to a second operation, which is executed when the second list is displayed, inputted to the terminal by the first user to designate the second user, who is already registered as a user in the first relation with the first user, the second registration part registers the second user as a user in a second relation with the first user, the second relation involving disclosure of a real name as well;
a third registration part configured such that in response to a third operation, which is executed when the first list is displayed, inputted to the terminal which is different from both of the first operation and the second operation by the first user to designate a third user, who is not registered as a user in the first relation with the first, the third registration part registers the third user as a user in the first and the second relations with the first user; and
wherein a real name of the first user is not disclosed to a user who is in the first relation but who is not in the second relation with the first user.

4. A user management method comprising:
displaying a first list of users in a social network on a display of a terminal of a first user, the first list including a nickname of a second user and a real name of a third user but not including a real name of the second user;
in response to a first operation which is executed when the first list is displayed, inputted to the terminal by the first user to designate the second user, registering the second user as a user in a first relation with the first user, the first relation involving disclosure of a nickname;
displaying a second list of users already registered as users in the first relation with the first user on the display of the terminal of the first user, which is different from the first list, the second list including the nickname of the second user but not including the real name of the second user and being displayed after the second user is registered as the user in the first relation with the first user;
in response to a second operation, which is executed when the second list is displayed, inputted to the terminal by the first user to designate the second user, who is already registered as a user in the first relation with the first user, registering the second user as a user in a second relation with the first user, the second relation involving disclosure of a real name as well; and
in response to a third operation, which is executed when the first list is displayed, inputted to the terminal which is different from both of the first operation and the second operation by the first user to designate a third user, who is not registered as a user in the first relation with the first user, registering the third user as a user in the first and the second relations with the first user, and
wherein a real name of the first user is not disclosed to a user who is in the first relation but who is not in the second relation with the first user.

5. An information display method comprising:
displaying a first list of users in a social network on a display, the first list including a nickname of a second user and a real name of a third user but not including a real name of the second user;
receiving a first operation which is executed when the first list is displayed, by a first user to designate the second user, as a user in a first relation with the first user, the first relation involving disclosure of a nickname;
displaying a second list of users already registered as users in the first relation with the first user, which is different from the first list, on the display, the second list including the nickname of the second user but not including the real name of the second user and being displayed after the second user is registered as the user in the first relation with the first user;
receiving a second operation which is executed when the second list is displayed, by the first user to designate the second user, who is already designated by the first operation, as a user in a second relation with the first user, the second relation involving disclosure of a real name as well;
receiving a third operation, which is executed when the first list is displayed, which is different from both of the first operation and the second operation by the first user to designate a third user, who is yet to be designated by the first operation, as a user in the first and the second relations with the first user, and
wherein a real name of the first user is not disclosed to a user who is in the first relation but who is not in the second relation with the first user.

6. A program for a computer, comprising:
by a first display control part, displaying a first list of users in a social network on a display, the first list including a nickname of a second user and a real name of a third user but not including a real name of the second user;
by a first reception part, receiving a first operation, which is executed when the first list is displayed, by a first user to designate the second user, as a user in a first relation with the first user, the first relation involving disclosure of a nickname;
by a second display control part, displaying a second list of users already registered as users in the first relation with the first user, which is different from the first list, on the display, the second list including the nickname of the second user but not including the real name of the second user and being displayed after the second user is registered as the user in the first relation with the first user;
by a second reception part, receiving a second operation, which is executed when the second list is displayed, by the first user to designate the second user, who is already designated by the first operation, as a user in a second relation with the first user, the second relation involving disclosure of a real name as well;
by a third reception part, receiving a third operation, which is executed when the first list is displayed, which is different from both of the first operation and the second operation by the first user to designate a third user, who is yet to be designated by the first operation, as a user in the first and the second relations with the first user; and
by a third display processing part, displaying a list of information about the users who are in the first relation with the first user, the list including the real names of the users in the second relation with the first user on the display and
wherein a real name of the first user is not disclosed to a user who is in the first relation but who is not in the second relation with the first user.

* * * * *